United States Patent
Horvat et al.

(10) Patent No.: US 7,342,755 B1
(45) Date of Patent: Mar. 11, 2008

(54) HIGH ENERGY CAPACITOR AND CHARGING PROCEDURES

(76) Inventors: Branimir L. Horvat, 1234 Scaplum Way, Sarasota, FL (US) 34242; Bozidar Stipanovic, 608 E. Longwood Dr., Lake Forest, IL (US) 60045

( * ) Notice: Subject to any disclaimer, the term of this patent is extended or adjusted under 35 U.S.C. 154(b) by 466 days.

(21) Appl. No.: 11/043,467

(22) Filed: Jan. 26, 2005

(51) Int. Cl.
*H02H 7/00* (2006.01)
(52) U.S. Cl. .............. 361/18; 361/19; 361/90
(58) Field of Classification Search .......... 361/18, 361/19, 90
See application file for complete search history.

(56) References Cited

U.S. PATENT DOCUMENTS

| | | | | |
|---|---|---|---|---|
| 5,199,429 A | * | 4/1993 | Kroll et al. | 607/5 |
| 6,055,168 A | * | 4/2000 | Kotowski et al. | 363/60 |
| 6,226,193 B1 | * | 5/2001 | Bayer et al. | 363/59 |

* cited by examiner

*Primary Examiner*—Stephen W. Jackson
(74) *Attorney, Agent, or Firm*—Frank A. Lukasik

(57) ABSTRACT

The invention is a high electrical energy storage system consisting of arrays of high energy capacitors and their charging and discharging protocols. An array of capacitors are conductively connected together and connected to an energy source. A computer and software control the charging and discharging of the capacitor banks.

15 Claims, 11 Drawing Sheets

HIGH ENERGY CAPACITOR AND CHARGING PROCEDURES

FIELD OF THE INVENTION

The present invention is directed to high electrical energy storage systems. The present invention is further directed to high capacity electrostatic plate capacitors. More specifically, the invention is directed to arrays of high energy capacitors and their charging and discharging protocols.

BACKGROUND

Steady growth of human population, accompanied by ever increasing levels of their activity, inevitably leads to increased demands for and consumption of more and more energy. Our energy producing capacities today would be sufficient for foreseeable future if only the losses in our present mode of energy production and distribution can somehow be curtailed or minimized. One of the quick and obvious ways in this direction would be to develop the technology to efficiently store the already produced electrical energy in existing power plants during the low demand periods and again release it in peak demand periods.

Present day energy storage systems consist of two major modes of operation: one, transformation of the already produced electrical energy into a different form of energy (static or kinetic) for storage, and transforming said stored energy into the electrical energy ready for distribution; the other stores electrical energy directly, without transformation, ready for distribution. Among former, Compressed Air Storage System, Flywheels, Pumped Hydro Storage, to name a few, are out of the scope of this invention. In the latter group, secondary batteries were given a lot of the attention by the industry due to their very high energy storage capacity and much higher energy interconversion efficiencies than the systems from the former group.

On the other hand, inherently slow chemical or electrochemical reaction rates, mass transfer, very large amounts of stored chemicals, potential of hazardous chemical spills, are some of the familiar problems that other battery systems have to cope with as well. As an example, after the Regenesys™ electrical energy storage system, using the electrochemical reaction between Na-tribromide and Na-polysulfide, reached a full commercial level and then, when multiple plants of 10 to 20-Mwh capacity were being built, all further commercial activity and development was abruptly terminated and abandoned. Most likely reasons for exiting, what initially appeared as a lucrative market, seem to be related to serious environmental and safety concerns about storing rather large quantities of potentially harmful materials.

Plate capacitors and supercapacitors on the other hand, store electrical energy electrostatically by polarizing a dielectric material between plate electrodes or by polarizing an electrolytic solution, respectively. There are no chemical reactions involved in either type of capacitor energy storage mechanism and charge-discharge cycles are fast and highly reversible, allowing for capacitors to have a long life under repeated and prolonged use.

Though supercapacitors may also find a place in our voltage cascading arrays, the subject of this invention is primarily concerned with plate capacitors, where high voltage is used to pack large amounts of energy for storage, according to the equation: $E=\frac{1}{2}CV^2$, where E is Energy (in joules), C is capacitance (in farads) and V is electrical potential between plate electrodes (in volts). Consequently, every time the voltage is doubled, the amount of energy stored is quadrupled.

The simplest device for storing electric charge is a capacitor, which consists of two conductor plates, each storing the opposite charges, separated by an insulator or dielectric. A variety of parameters influence the respective capacity, that is, a measure of the amount of energy that can be condensed between the electrodes of a capacitor. The following are some of these parameters:

a) The effectiveness of dielectric properties of the used materials determines how much charge a capacitor is able to store and it depends on the material the dielectric is made of. The ratio of the electric field strength in a vacuum ($\in_0$) to that with a dielectric medium ($\in$) is called the relative permittivity ($\in_r$) or better known by previously used term, dielectric constant ($\kappa$).

$\in$(or $\kappa$)$=E_0/E$, where $E_0 \leq E$ $\in$(or $\kappa$)$\geq 1$ b) The capacitance (C) of a capacitor is a measure of how much potential (V in volts) appears across the plates for a given charge (Q):

$C=Q/V$

If a charge (Q) of 1 coulomb causes a potential of 1 volt across the plates, then the capacitance (C) is 1 farad (F). Based on relative permittivity ($\in_r$), the capacitance of a parallel-plate capacitor can be derived as:

$C=\in_0\in_r A/D$ A=surface area of the plate

D=distance between plates c) The energy stored in a charged capacitor (in joules) is given by:

$E=\frac{1}{2}CV^2$

From the above equation it follows that a total amount of energy stored is proportional to the square of the potential across the plates.

d) An extremely important property of dielectric materials, used in capacitors, is the dielectric strength, defined as a maximum potential gradient that material can withstand without breakdown. Practically, the dielectric strength is reported as the breakdown voltage, divided by the distance between electrodes, separated by the dielectric. If the voltage across a dielectric insulator becomes too high, the intensity of the electric field may cause sudden collapse of the dielectric medium, i.e. dielectric breakdown (corona) takes effect.

e) The inefficiency of an insulating material under ac conditions is measured by a dissipation factor ($\sigma$), defined as a degree of dielectric loss, due to a dissipation of energy in the form of heat.

f) The voltage across the plates of a capacitor changes during charging and discharging, resulting in electrical current (i), where:

$i=Cdv/dt$ g) Dealing with capacitors that store huge amounts of energy may inevitably involve problems of extremely high electric currents. Super conductive materials are therefore considered logical for construction of large capacitative devices, since extremely low or no resistance at all, will prevent energy losses.

All of the elements listed above have to be rigorously taken into account when building a capacitor, especially one that is intended for the storage of huge amounts of electrical charge, such as found in applications for power plants: storing excess energy during low demand periods, and later supplying the grid at critical times of a high demand. In short, storing energy that at present time is simply wasted, dissipated as heat and never used for anything, would become possible, if only suitable and reliable capacitors can be built.

It is evident that merely fifteen years ago the material science plainly did not exists at the level necessary to provide materials required for building powerful capacitors economically on a large scale. Only expensive and heavy high capacity devices, used mainly in high energy physics applications were available when we first conceived the idea of large scale capacitive energy storage system. The real quantum leap in material science, related to electrotechnical field, occurred with the discovery of high temperature superconductive copper based oxides. These oxides belong to a large family of materials, with crystal structures related minerals named perovskites. At room temperature these copper containing oxides are insulators, but when cooled down to liquid nitrogen temperatures (80 to 120 K) such insulators at some point become superconductive. This important discovery triggered an intense research and development in material science. Especially captivating results were related to structure and fascinating properties of perovskites, leading several years later to the discovery of colossal magnetoresistance (CMR) found in some manganese based oxides. Most recently certain titanium based oxides with perovskite structure, exhibited giant dielectric permitivities never before observed.

In addition to novel inorganic, mineral materials, a number of new organic materials have come on stream, with diverse properties ranging from very low to high conductivities, high polarizabilities (resulting in high dielectric permittivity), high dielectric strength and so on. Soon, a quest to build a very high capacity device is going to become a reality; thanks to new materials it is going to be possible to condense extremely large amounts of electrical charge into rather small volume of space.

In summary, the effectiveness of a capacitor is contingent on parameters a) to g) listed above, first, as it pertains to properties of the dielectric material, and second pertaining to the design and geometry of basic elements of a capacitor:

A) Function of Properties of Dielectric Materials the capacitance (C) is directly proportional to relative permittivity ($\in_r$):

$C=\in_0 \cdot \in_r A/D$ the energy stored (in Joules) in a charged capacitor, with capacitance (C), is directly proportional to the square of potential (V) in volts, between the electrode plates:

$E=\frac{1}{2}CV^2$ dielectric strength (maximum potential between plates that dielectric material can withstand without breakdown)

B) Function of Design and Geometry capacitance (C) is directly proportional to the surface area (A) of the plates;

Capacitance is inversely proportional to the distance (D) between the conductive plates, enclosing a dielectric material between them.

To build a capacitor capable of storing enormous quantities of electrical energy, as envisioned in our accompanying invention, one has to utilize the latest achievements in material science and theoretical understanding of how a design and geometry may optimize the effectiveness of these, state of the art materials and their composites.

An exemplary capacitor will be constructed of materials that show maximum performance for each basic element of a capacitor: material displaying giant dielectric permittivity will be used as dielectric, high temperature superconductors will be considered as electrode plates material, materials displaying colossal magnetoresistance (CMR) and ultra low conductivity materials can serve as components of composites displaying very high dielectric strength properties.

Materials with properties as listed above would then allow optimal geometric configuration, such as the smallest possible distance between plates on account of high dielectric strength. Consequently, high capacitance and high potential will result, with no random dielectric breakdown occurring.

Obviously, a number of compromises will have to be considered. First that comes to mind is a price: any new, qualitative leap in development is going to carry a significant price tag in the initial phase, but when large scale production comes on stream the cost will cease to be a factor, especially considering the benefits.

Dielectric Materials

Lately, great advances in new materials with enormously high polarizabilities have been disclosed in the literature. The discoveries were made in both, inorganic and organic materials: either type displays an extremely high dielectric permittivity, a property of a material that determines its ability to become electrically polarized.

As an example of inorganic materials with giant dielectric permittivity, a perovskite related oxide containing calcium (Ca), copper (Cu), titanium (Ti) and oxygen (O) with the formula $CaCu_3Ti_4O_{12}$ displays a dielectric permittivity in excess of 80,000.

In addition to this, unlike most dielectric materials, this oxide retains high dielectric permittivity over a wide range of temperatures, from 100 K to 600 K (−173° C. to 327° C.). However, below 100 K or so, a dramatic reduction in dielectric permittivity (about 100 fold) was measured. On the other hand, and very unexpectedly, no detectable changes in long range crystallographic structure were observed. The temperature dependent reflectance measurements over a wide range of frequencies (20-23,000 cm$^{-1}$) displaying sharp features at low frequencies due to active infrared lattice vibrations, revealed an anomalous gain in oscillator strength with decreasing frequency and, more importantly, with decreasing temperature. The current hypothesis attributes the giant dielectric phenomenon to an integral barrier layer capacitance (IBLC) effect, manifested by the discrete semiconductive regions, separated by insulating barriers. The anomalous and dramatic reduction of dielectric permittivity at low temperatures suggests a semiconductor-insulator (SI) transition, thereby effectively terminating the IBLC effect.

Among the highly conjugated cyclic organic compounds and their complexes with metals, one cyclic metallothalocyanine (MtPc) oligomer, with copper as a metal, displayed a dielectric permittivity as high as $10^5$; (Huang, C.; Zhang, Q. M; deBotton, G.; Bhattacharya, K. PACS No. 77.04.-s, 77.65.-j 77.84.Lf, 77.84.Jd)

Also, a large number of organic materials for a non-linear optics (NLO) applications has been reported in the literature. A common property they all posses is a large polarizability. As a consequence, high polarizability should affect and, in significant measure, augment their dielectric permitivities. By designing novel oligomeric and polymeric NLO molecules, new organic compounds endowed with very high dielectric permittivities become feasible, hence, applicable as dielectric materials in capacitor designs.

Insulating Materials

Electrical insulator is a medium or a material which permits only a small, negligible current to flow through when voltage is applied across. The term "dielectric" is often synonymous with the term "insulator".

Since air has $\in_r=1$, the latest in low κ materials usually contain micro- or nano-voids filled with air. It was shown (by IBM) that dielectric permittivity of silicon dioxide, $SiO_2$, ($\in=4$) can be lowered by generating pores filled with air, in the interior of a thin film cast from a solution of a polysiloxane precursor containing a porogen. After ramping up the temperature, the film was calcined, resulting in $SiO_2$ coating with $\in=2.7$-$2.8$.

Mesoporous silica films with pores aligned parallel with the surface of the substrate were fabricated by nano-phase transition of an organic-inorganic nanocomposite under vapor infiltration of tetraethoxy (TEOS) or tetramethoxy (TMOS) silane. If such mesoporous silica would be used in construction of a capacitor, the pores would be oriented orthogonally to the electric field, thereby effectively decreasing the permittivity of the film ($SiO_2$, $\in=4$, air $\in=1$)

Organic polymeric films with low permittivities, like parylene, are also candidates for use as insulators. Analogously to the case of organic oxide materials, the presence of micro voids filled with air in a film can also significantly lower $\in$. When used in capacitors, the polymeric material is used in the form of a thin film, orthogonally to the electric field. Hence, the permittivity in the lateral direction is of no concern. But, if the air filled voids have a shape of a flattened sphere parallel to the surface, much larger surface area of low conductivity would be orthogonal to the field direction. By biaxially drawing a stretchable polymeric film, containing microvoids filled with air, the effective $\in_r$ of the film was shown to be some 30% lower than the value of $\in_r$ for respective film-forming polymer. Methods for introducing microvoids into polymeric material films were rather active field of development in the early 1970-ties. Microvoids with diameters matching the wavelengths of visible light were used for opacifying purpose in coatings, mainly as substitute for solid opacifiers, like $TiO_2$. A number of methods for producing microvoid structures were developed: freeze drying, extraction, phase or solvent incompatibility, imperfect packing, etc. Some of these methods could be applied today to form air occlusions in stretchable polymeric materials with low values of $\in_r$. Subsequent biaxial stretching process would result in voids, shaped as flattened spheres, thus reducing even further the respective $\in_r$.

In 1993 for the first time it was reported that certain manganese oxides showed an enormous change in dielectric resistivity when a magnetic field was applied. The effect observed in these oxides—the manganese perovskites—was named "colossal magneto-resistance" (CMR), i.e. a small change in an applied magnetic field dramatically changes the electric resistance of the material.

Perovskite manganites have a general formula:

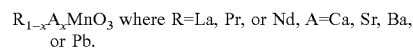
$R_{1-x}A_xMnO_3$ where R=La, Pr, or Nd, A=Ca, Sr, Ba, or Pb.

Conduction in these materials is explained by the "double exchange" mechanism, where the conductivity results from the process of electron hopping back and forth between neighboring Mn ion. This process is at maximum when magnetic moments of Mn ions are aligned parallel and at minimum when they are anti-parallel. Hence, when ferromagnetic, these materials are conductive, and when antiferromagnetic they display an insulating behavior. Such transition is a function of temperature and some recent publications show that conduction in these materials is predominantly $O_2$ hole-driven. In spite of a large number of scientific studies, resulting in better understanding of mechanisms playing a role in an onset of CMR, applications of this phenomenon have not yet kept up with the pace of the research efforts.

Nonmetallic Conductive Materials

When certain conjugated organic polymers like polyanilines, polypyrols, polythiophenes etc., are doped in order to interrupt the conjugation and become electron-conductive materials. For more than one reason, polyaniline doped with sulfonic acids, thereby converted into metallic-like conducting polymer ("emeraldin"), is a conductor of choice: low cost, simple preparation, easy incorporation into the electric devices, light weight compared to metals, and a high, metal-like electron conductivity, give it an edge over other polymeric conductors. A recent report describes very conductive and flexible, stretchable polyaniline films doped with sulfosuccinic acid esters. Such stretchable polymeric conductor coupled with stretchable insulating polymers, containing air-filled microvoids, mentioned earlier, would result in a clad-like material that can be biaxially stretched into a film applicable for capacitor building: a conductive film enclosed in an insulating barrier, with an increased dielectric strength and resistance against voltage breakdowns.

Among the inorganic, non-metallic conductors by far the most fascinating and intriguing are the high temperature superconductors. The theoretical understanding of superconductivity is extremely complicated, as it should be, for a material that at some point on the temperature scale completely lose their resistance and begin to conduct electricity with no loss of energy. In the case of metals with normal conductive state becoming superconductors at the liquid helium temperatures (boiling point: 4.2 K or –268.9° C.), at the present time there is rather good theoretical understanding of the physics behind the phenomenon. According to the BCS Theory (Bardeen, Cooper, Schrieffer), atomic lattice vibrations (phonons) alter the flow of electrons in such a way that they start moving in coherent pairs (Cooper pairs) through the conductive material. Under the influence of phonons, the electrons are screened and separated by some distance. When the first electron of a Cooper pair passes by a positive ion in the crystal lattice, the mutual attraction of the opposite charges causes vibration (phonon emission) to pass from ion to ion, until the other electron of the pair absorbs the vibration (phonon absorption). It is this exchange that keeps the Cooper pairs together. Since electrons are indistinguishable particles, the pairs are constantly forming and breaking and only for the sake of illustration the concept of permanently paired electrons is used. When atoms of a crystal lattice oscillate as positive and negative regions, electrons, despite having the same charge, are pulled together in pairs and then pushed apart without undergoing a collision.

As long as the temperature is very low, the existence of Cooper pairs is not disturbed by weak molecular motions. Above a certain temperature—critical temperature ($T_c$)—the vibrations in the lattice become violent enough to break up the pairs, hence loss of superconductivity.

Bellow the $T_c$ the resistivity is exactly zero and there is no loss of electrical energy. Therefore the superconductors are capable of carrying very large currents, as opposed to normal conductors. However, there is a maximum current that can pass through a superconductor: when the amount of current exceeds the limit—Critical Current Density ($J_c$)—value, the material ceases to be superconductive and it reverts to the normal state.

If a superconductor is placed into a magnetic field (H), the field will be "pushed" out of the material and it will remain on the outside, around the superconductor as long as the temperature is below $T_c$. The reason for this phenomenon is that a magnetic field induces surface current in the superconductor, which in turn creates a magnetic field exactly opposite to the incident field. The superconductor thereby becomes perfectly diamagnetic, keeping all of the magnetic flux outside of its interior. This magnetic exclusion is the cause of the Meisner Effect, which is actually a demonstration, where a small permanent magnet levitates above a superconductor. Depending on the strength of the magnet and the temperature the field H may eventually begin to penetrate the superconductive material, resulting in non-superconducting regions. At a given temperature when a strong enough magnetic field is reached, the superconductivity reverts to a normal state. This is known as the Critical Magnetic Field ($H_c$).

There are two types of superconductors, Type I and Type II. Very pure metals like lead, mercury and tin are examples of Type I superconductors. Type II, the high temperature superconductors, are represented by rare earth copper oxide materials, belonging to a class known as perovskites, which in the normal state display mechanical and physical properties of ceramics. The key elements to the behavior of these materials is the presence of layered $CuO_2$ planes, with Cu atoms forming a square lattice and O atoms formed between each nearest-neighbor pair of Cu atoms.

Most ceramic materials are considered good electrical insulators. YBCO compounds, also known as 1-2-3 compounds, are very sensitive to oxygen content. (Y=Ytrium, B=Barium, C=Copper, O=Oxygen). In fact, the material with the formula $YBa_2Cu_3O_{6.5}$, can go from a semiconductor to a superconductor, $YBa_2Cu_3O_7$ without losing its crystalline structure.

The rest of the atoms, rare earth atoms (Y), dopants and excess Cu and O, lie in charge reservoir layers, separating the $CuO_2$ layers. These charge reservoir layers control the oxidation state of the planar copper ions, which is either $Cu^{2+}$ or $Cu^{3+}$. The $Cu^{2+}$ ion has a single unpaired 3d electron (spin ½), while in $Cu^{3+}$ state all 3d valance electrons are paired.

High temperature superconductors are formed when "undoped parent compound", with properties of insulative antiferromagnetic material, is "doped with holes". In an undoped state all of the planar coppers are in the $Cu^{2+}$ state, with one unpaired spin per site. The unpaired spins arrange themselves into the antiferromagnetic order, where neighboring spins are antiparallel. The insulating character is mostly the result of a high-energy cost of putting the extra electrons ("double occupancy") on Cu atoms. Removing electrons or adding holes to these materials destabilizes antiferromagnetic order and relieves the electronic congestion, transforming thereby insulators into conductors.

Often times phase diagrams are used to keep track of these large qualitative changes in properties, by subtle changes in chemical composition the solid lines are phase boundaries.

Type I superconductors have values of critical field strength ($H_c$) too low to be very useful (pure lead: $H_c$=800 gaus). Type II materials, on the other hand, have much larger critical field strengths that can measure up to tens of tesla units (1 tesla T=$10^4$ gaus). YBCO superconductors have values for $H_{c2}$ for instance, as high as 100 T ($10^6$ gaus).

The superconducting state is determined by three equally important factors:
1. Critical temperature ($T_c$);
2. Critical field ($H_c$);
3. Critical current density ($J_c$).

All of these parameters are very much interdependent on the other two critical values present. In order to maintain the superconductive state all three parameters are required to stay below their critical values, all of which depend on given material.

Design of Capacitors

In order to build capacitors capable of storing high amounts of energy, one must start with the best components material science and solid state physics have to offer. The price is secondary when proof of concept is the goal; the economy of scale will eventually take care of the price problem.

We envision two basic approaches to designing a capacitor using the same materials but arranging them in different geometrical configurations:
 a. Percolative composite material.
 b. Layer-by-layer deposition of high dielectric permittivity materials, interspersed with a multi-layer, tile like, flat film materials possessing a high dielectric strength.

a) Percolative Composite Material

Properties of random systems composed of different materials are determined by the spatial distribution of the system components, especially when the system is near a critical point and is about to begin a structural phase transition. Specifically, the mathematical model deals either with site percolation or bond percolation.

Cluster is a set of occupied sites mutually connected.
Spanning cluster has an element at two opposite edges of the site matrix.
p is occupation probability.
$p_c$ is critical site occupation probability.
At $p<p_c$, spanning clusters never occur.
At $p>p_c$, spanning clusters always occur.
$p=p_c$ is a critical point where a qualitative transition in behavior of a system occurs: typically, between ordered and disordered states. In our case the transition is from no spanning clusters to always spanning.

Since the amount of energy stored in a capacitor is directly proportional to the voltage squared ($\in=\frac{1}{2} CV^2$), the dielectric strength plays a crucial role in determining the final efficiency of a capacitor. In a percolative composite approach [C. Huang, Q. M. Zhang, F. Xia, Q. Wang, J. Su—Polymer Preprints, 2003, 44 (2) 363], both dielectric permittivity and breakdown voltage were significantly increased. Also, it was found that if a composite contains metal particles coated with an insulator, at a concentration f, close to the point of percolation, there is a marked increase in dielectric permittivity of the composite. Compared with the approach of high dielectric permittivity particles (dielectrics) dispersion in a polymer matrix, the percolative composite method requires much lower volume of the filler in order to raise the permittivity substantially above that of a matrix. Another huge benefit is that these composites can withstand a relatively high breakdown field even at compositions near the percolation threshold.

Syntheses of insulated metal nanoclusters have been reported in the recent literature. Various metals (Ni, Co, Cd, noble metals, etc.) were dispersed and stabilized in the form of nanoclusters and stabilized in the form of nanoclusters and subsequently coated with insulating molecules (E. Tena et al., Chem. Mat., 2003, 15, 1607-1611; D. Kim, et al., Chem. Mat., 2003, 15, 1617-1627—are just a couple of examples).

Relatively simple preparation of metal nanoclusters by reduction of respective salts and their subsequent stabilization with, e.g., Na-Oleate, results in an insulated metal nanocluster, that can then be used in building a percolative composite material with high dielectric permittivity and dielectric strength.

Instead of metals, a fine dispersion of polymers possessing a metallic conductivity, encapsulated with polymers of low permittivity, will result also in useful material for building capacitors by a percolative composite method.

Yet another approach that will be applicable for metal cluster dispersion formation in solid insulators, such as $Al_2O_3$, $SiO_2$, $HfO_2$, etc., is self-assembly of mesoporous metal-metal oxide templated solid solutions (A. Ozin and coworkers, JACS 2000, 122 (37), 8932-8939) A self-assembly of anionic yttrium-zirconium glycolate with metallic salts or complexes such as nickel chloride, nitrate or acetate, hexachloroplatinate, etc., led to formation of mesoporous platinum- or nickel-yttria-stabilized-zirconia material. On calcination at 600° C. the organics are lost and metal-yttria-stabilized-zirconia mesoporous material was obtained as a result. Such an approach may turn to be a general way to synthesize metal-metal oxide composites for use in capacitors.

Another innovative method of making percolative nanocomposites described by the same group [G. A. Ozin et al., JACS 2003, 125 (17) p. 5161-5175] features a one-pot, soft chemistry, surfactant-assisted co-assembly to obtain $La_{1-x}Sr_xMnO_3$ (LSM)/$Y_2O_3$-stabilized $ZrO_2$ (YSZ) nanocomposites. The material possesses sub-hundred nanometer grain sizes for each phase (FIG. 14). The method utilizes co-assembly of aqueous-based precursors of each component which are at the end incorporated into the nanocomposite in a single synthetic step. As synthesized, the product is an amorphous mesostructured organic/inorganic composite, which is then transformed into a mesoporous inorganic oxide with nanocrystalline YSZ walls upon calcination at 450° C. Further calcination above 600° C. led to collapse of the mesopores, followed by crystallization, resulting in final perovskite phase at temperatures above 1,000° C.

This method which uses no preformed composite component particles, may be of general interest, especially in the case of dielectrics synthesis for building capacitors. A one-pot synthetic route is potentially very relevant: no need for two separate synthesis and high temperature calcination steps, hence low energy and time cost. The ratios of the components of the nanocomposite may be adjusted at the beginning of the synthesis to correspond to the values of percolation threshold.

And finally, the same approach may also be relevant in synthesis of superconductor/colossal magnetoresistance material (CMR) percolation composites, which we propose to be used as dielectrics for building high energy capacitors. The other proposal is to make electrode plates of capacitors from the same or similar high temperature superconductive material. The advantage of electrodes being superconductive is obvious, since there is no resistance when such capacitors have to endure very high electric currents during charge-discharge cycles. The methods of forming superconductive films are already known in the art, and they, among the others, are selected from reactive co-evaporation, off-axis sputtering, MBE (molecular beam epitaxy), CVD (chemical vapor deposition), laser ablation, etc.

The proposal of making superconductor/CMR composites for dielectrics is not as obvious. Earlier in the text we have described giant dielectric permittivity materials and mentioned that their high permittivity values are practically constant in the 100-600 K region. Unfortunately, their $\in$ of close to $10^5$ is reduced 100-fold below cca 100 K. C. C. Homes et al. (arXiv: cond-mat/0209367 V1 16 Sep. 2002) rationalize this phenomenon as semiconductor-to-insulator (SI) transition, leading to expansion of the insulating domains and commensurate reduction of $\in$. This phenomenon severely limits applicability of giant dielectric materials in construction of superconductive capacitors. But we still propose the use of these giant $\in$ materials with newly discovered high temperature superconductors; with $T_c$ values of over 120 K, still sufficiently higher than 100 K (SI-transition).

On the other hand, the proposed composite embodying nanoclusters of a superconductive Cu oxide perovskite material dispersed within a CMR (Colossal magnetoresistance material) phase, at below the percolation threshold concentration, would maintain a structure that will exhibit internal barrier layer capacitance (IBLC) effect way below 100 K temperatures. At these conditions, say below 90 K, superconductivity would be fully developed and CMR materials would act as insulators.

It is the transition phase above the CMR transition critical temperature that is most intriguing and interesting, where extremely powerful magnetic fields around superconductive nanoparticles exist, and which in turn effect colossal magnetoresistance of surrounding material. These phenomena are quite unexplored but taken together they may lead to unexpected properties and behavior of materials: a percolative composite comprising nanoparticles (from 1-10 nanometers) of CMR (Colossal Magneto Resistance) and HSC (High temperature Super Conductors), materials, respectively, may exhibit extremely high $\in_r$ (relative permittivity) and dielectric strength, to mention a few. Sintheses of metal nanoclusters are numerous in the literature. Synthesis of nano sized metal oxides have also been described in the literature (Pozniak, S. K.; Kokorin, A. I.: Kulak, A. I. Electroaanl. Chem. 1998, 442, p. 99 and Shchukin, D. G.; Caruso, R. A. Chem. Mat. 2004, 16, p. 2287.

Equally intriguing and, so far, hardly at all experimentally verified, is the answer to a question: what happens when a fully charged high-energy superconductive capacitor is brought to a temperature higher than the respective $T_c$ of the material. It is already evident that perovskite materials undergo very little, if at all, structural changes during these transitions. Only the electrons and crystal lattice elements interact exclusively in this process. The energy transfers are governed by the laws of quantum mechanics. How such an energy-packed system may revert to a ground state is an interesting question. Are there some quantum mechanically forbidden pathways for reverting to the beginning state (not unlike photo and thermal pathways in pericyclic reactions in organic chemistry)? What kind of material would that turn into, with all that polarization of electronic cloud and no conductors in site to convey it? Would it become a supercapacitor again if cooled down in the liquid $N_2$? Or, more logically, how catastrophic a release of all that energy will be, if none of the above holds? If any of these hypothetical cases materialize, the outcome would be extremely interesting from a purely theoretical, to a definitively practical point of view: from having a safe energy-storage system, if polarization is maintained, to a very sensitive and safety-burden storage system, if a catastrophic reversion to the starting state is a consequence of a sudden loss of cooling provision.

The high efficiency capacitor and various modifications described heretofore enable these capacitors to be charged with a large amount of electric energy due to the permittivity of the materials and the very high dielectric constant provided thereby. The use of "barriers" between the charged plates of the capacitors allow for significantly higher voltages than is presently possible.

Operation of Charging and Discharging of the High Energy Capacitors

A. Introduction

Only DC electricity can be used for charging capacitors with large amounts of electric energy. This energy is stored as static electricity resulting in the lowest losses of energy from dissipation and loses due to heat. Currents will flow only during charging of these capacitors and during the discharge phase. During the "dormant" phase the charged capacitors will stay essentially unchanged. (Obviously, a small amount of energy will be inevitably dissipated but it is a negligible factor particularly when compared to present energy losses from power plants and other conventional generation systems.

The essence of the present invention is in the design of condensers capable of being charged with very high levels of energy to maximize the energy density contained therein. To accomplish these desired energy levels, it is essential to maximally increase the charging voltages for the capacitors. As those skilled in the art will be aware, a linear increase of the applied voltage results in an exponential increase in the amount of the energy density within the capacitors.

Prior art systems for raising an electric current from a low voltage to a high voltage require transformers. However, they are bulky, emit strong secondary electromagnetic fields, lose substantial energy due to associated heat and failures are common due to the significant currents they are constantly handling when AC electricity is used.

The present invention utilizes only DC electricity for charging the capacitors which facilitates the production of extremely high voltages.

The only limitation of the height of the voltage which can be achieved using the present invention will be determined by the tolerances of the materials used. These limits are at present unknown as there are no data to determine them because nobody has thus far used the present invention system or raised voltage to these new high levels.

Raising Voltages

The present invention addresses the problem of raising voltages to significant levels by using capacitors in a unique way not found in the prior art. The present invention seeks to solve the problem of raising voltage by designing a series of "low" voltage capacitors which, when connected in series provide a resultant high voltage. The process of transforming the initial low voltage source of electric energy into high voltage energy will occur in very short periods of time, sometimes measured in nanoseconds. This operation will be controlled through software designed to detect voltage levels and presence or absence of flow (currents) of electricity at different point of the system The software will necessarily be designed to detect these changes and modify them with efficient orders to react appropriately to specific infinitesimally short events in the system. Thus, computers will direct the operation of the system detecting these predetermined conditions in various parts of the system, and reacting with appropriate commands thereto.

The source of electric energy for charging the high voltage storage capacitors may be almost any ordinary and conventional electric energy source, even a very low voltage source.

Obviously, if this source is not already in DC form, it will have to be converted enabling significant increases in voltage without the use of conventional transformers. The system will be of a solid state construction and once energized, will be independent of other energy sources thus becoming a portable energy unit.

Operational Sequence of the Present Invention

In the following discussion wherein the operational sequence for raising voltages is described using DC electricity, it should be noted that this operation may be used in all instances where there is a need to substantially increase voltages and that while this description describes a method for so doing, the present invention is not limited in its scope to the sequence described but may be modified in different ways to accomplish the same ends without compromising the essence of the invention.

B. Components of the System for Charging and Discharging New High Energy Capacitors:

I. Source of electric power.

II. Capacitors:

a. Capacitors of the Initial Charging System: from CaIN-1 through CaIN-N.

b. Capacitors of the Intermediate Charging area: From CaIM-1 through CaIM-N, and if more than one Intermediate Charging area is the part of the system then from CaIM1-1 to CaIM1-N through CaIMN-1 to CaIMN-N.

c. High Energy Density storage Capacitors CaS or if more than one is part of the system then CaS-1 through CaS-N.

d. Capacitors of the Discharge area:

aa. High capacitance capacitor(s), CaDHC-1 through CaDHC-N.

bb. Low capacitance capacitor(s), CaDLC-1 through CaDLC-N.

III. Switches:

a. Switches for charging of the individual capacitors of the Initial Charging area: SwChIN-1 through SwChIN-N.

b. Switches for connecting individual capacitors of the Initial Charging area to function as the series of capacitors: SwSIN-1 through SwSIN-N.

c. Switches for charging of the individual capacitors of the Intermediate Charging area: SwChIM-1 through SwChIM-N or if more than one Intermediate Charging area is used then SwChIM1-1 though SwChIM1-N to SwChIMN-1 through SwChIMN-N.

d. Switches for connecting the capacitors of the first Intermediate Charging area to function as the series of the capacitors, SwSIM-1 through SwChIM-N, or if more than one Intermediate Charging area is used then SwSIM1-1 through SwSIM1-N to SwSIMN-1 through SwSIMN-N.

e. Switches for connecting the serially connected capacitors of the Initial Charging area with the capacitors to be charged in the first Intermediate Charging area SwC1IM. If more than one Intermediate Charging area is in the design of the system then they will be labeled as SwC2IM, SwC3IM, SwC4IM, etc.

f. Switches for connecting the entire charging area with the high-energy storage capacitor area, SwS. When more that one storage capacitor is present there may be more than one of such switches, SwS-1 through SwS-N.
g. Switches connecting the storage capacitor(s) area with the Voltage Divider area SwD-1 through SwD-N.
h. Switches connecting in succession the low capacitance capacitors of the second choice of voltage Divider SwLCD-1 through SwLCD-N and switches for connecting high capacitance capacitors of the Divider SwHCD-1 through SwHCD-N.
i. Switches for connecting the Discharge area with the user, SwU.
   Switches from a. to f. may be designed as static switches dedicated for each capacitor and specific functions or may be designed that the same switches serve successfully several rows of capacitors as per needs of the system.
   IV. Sensors:
   a. Voltage sensors.
   b. Electric current sensors.
   V. Computers with Appropriate Software for Controlling the Operation of the System
   C. Charging of the High Energy Density Capacitors In order to achieve the highest possible voltage for charging High Energy Density Capacitor(s) (HEDC) the present invention uses materials in the design of the capacitors which are specifically formulated for that purpose.

These capacitors may be designed as a single row, labeled as the Initial Charging area, or, if the need for higher voltage is required, one or more of these rows may be constructed to accomplish this. These additional areas will be labeled as the Intermediate Charging areas.

The system may be designed such that all capacitors of the same area are charged simultaneously, (but always as single capacitors.)

It is possible also to design the system such that one can charge single capacitors individually and successively, or charge them as groups in the same row (but always charging them as individual capacitors even though they are charged simultaneously).

Initial Charging System

The first row of capacitors will be hereinafter designated as the Initial Charging System. Individual capacitors of this part of the system are labeled as CaIN-1 through CaIN-N.

Intermediate Charging Areas

When higher voltage is needed, the next row of capacitors, (one or more of them), will be labeled as Intermediate Charging areas of capacitors. The individual capacitors of this part of this part of the system are labeled as CaIM1-1 through CaIM1-N (the number one after CaIM designates the position number of the specific Intermediate Charging System when more than one is used—CaIM2-1 through CaIM2-N, etc., and CaIMN-1 through CaIMN-N).

Switches

Between each of the capacitors of each of these areas or rows of capacitors, there will be a switch for connecting or disconnecting them from the other capacitors of the series. Thereby creating a series of capacitors or disconnecting it. They are labeled in this presentation as SwSIN-1 through SwSIN-N for the Initial Charging System or SwSIM1-1 through SwSIM1-N for the first Intermediate Charging area and SwSIMN-1 through SwSIMN-N for the last row of these capacitors.

This switching system will enable these capacitors to be either charged individually, (when these switches are open and do not allow communication between individual capacitors), or act as the series of capacitors when the switches are closed to allow a current from the first to the last capacitor of each in this area or row.

For charging capacitors of the Initial Charging area, there will be separate switches for connecting the power source with each individual capacitor of this row allowing that these capacitors are charged as necessary.

A switch is labeled as SwChIN-1 for the first of these capacitors through SwChIN-N for the last capacitor of this area.

A similar switching system will be present for each capacitor of the Intermediate Charging areas, labeled as SwChIM1-1 through SwChIM1-N for the first Intermediate Charging area to SwChIMN-1 through SwChIMN-N for the last row of capacitors. These switches will enable the system to charge each capacitor of each row of the capacitors appropriately and individually.

Charging of individual capacitors of the Initial Charging System will be accomplished by opening the switches SwIN-1 through SwIN-N thus disconnecting them from each other and enabling them to be charged individually.

At this point any of the available charging options may be selected, from simultaneously charging each individually to charging them separately and successively as individuals or groups.

Simultaneous Charging of the Initial Charging Area

All of the capacitors of the Initial Charging area may be charged at the same time. All senior Intermediate Charging areas may be charged after the capacitors of the Initial Charging area are fully and successively charged. This will cause pulses of electricity to charge each new row of the capacitors when the previous row has been successfully charged.

The switches SwChIN-1 through SwChIN-N will be closed and charging of all capacitors commences. Each of these capacitors individually is charged at that time to the voltage level of the outside source of electricity.

When this is charging is finished, and the computer detects identical voltage at the power source and in the capacitors of the Initial Charging area, and no more current flows between the power source and the capacitors, then all switches from SwChIN-1 through SwChIN-N are opened and connection with the power source is cut off.

Simultaneously, switches SwIN-1 through SwIN-N are closed and these capacitors are now connected in series.

If this is the only charging area present, switch SwS is closed and the High Energy Density Capacitor(s) CaS receives the first charge (when more than one High Energy Density Capacitor CaS-1 through CaS-N is present, then switches SwS-1 through SwS-N are closed).

At the point when the voltage of the capacitors CaIN-1 through CaIN-N falls, the computer opens the switches SwS (or SwS-1 through SwS-N) and disconnects the communication between the charging area and the High Density Energy Capacitors.

This process is repeated and the next charge to the CaS is delivered, etc., etc. At each of these pulses, the voltage of the storage capacitor CaS rise corresponding to the energy stored in it. When the maximum voltage is reached, no more charging is done and the process of charging is stopped. These steps are happening in a very short periods of time, at times infinitesimally short ones necessitating the use of computers to manages the process.

In the event that the voltage required is greater than that which can be delivered by the Initial Charging area alone, then one or more Intermediate Charging areas are interposed between the Initial Charging area and the High Energy Density Capacitor CaS to reach the higher voltage When charging of the Initial Charging area is completed, switches SwChIN-1 through SwChIN-N are opened and switches SwIN-1 through SwIN-N are closed. The computer initiates these openings and closing of the switches by detecting identical voltage at the power source and in the capacitors of the Initial Charging area. It also detects that there is no current between the power source and the capacitors of the Initial Charging area. At the same time, switches SwIN-1 through SwIN-N are closed and these capacitors are now connected in series.

A fraction of time before Switch SwS1IM is closed, the switches SwIM1-1 through SwIM1-N are opened and switches SwChIM1-1 through SwChIM1-N are closed.

The energy from the Initial Charging area is discharged to the capacitors of the First Intermediate Charging area. The voltage is equalized between these two areas and there is no more current present.

Due to release of a portion of the energy to the capacitors of the first Intermediate Charging area the voltage of the individual capacitors of the first Intermediate Charging area will be lower than was the voltage of the capacitors connected in series of the Initial Charging area. This causes the computer to open the switch Sw1IM and disconnect the Initial Charging area from the First Intermediate Charging area. At this time the charging of the capacitors of the Initial Charging area may again commence. At the same time the switches SwChIM1-1 through SwChIM1-N are opened as well. The switches Sw1IM-1 through Sw1IM-N are closed and as a result all capacitors of the first Intermediate Charging area are now connected in series. The switch SwS2IM is closed along with the switches SwChIM2-1 through SwChIM2-N and switches Sw2IM-1 through Sw2IM-N are opened. This results in charging of the second Intermediate charging area capacitors.

This process is repeated successively until the last Intermediate Charging area capacitors are charged. When this happens, the switches SwChNIM-1 through SwChNIM-N are opened, the switches SwNIM-1 through SwNIM-N are closed connecting the capacitors of the last Intermediate Charging area in series and switch SwS is closed (or if more than one CaS present than SwS-1 through SwS-N are closed) resulting in charging of the High Energy Density capacitor(s).

This process continues until the capacitor CaS (or if more than one of these capacitors are the part of the design than CaS-1 through CaS-N) is fully charged. During this charging, every new pulse of the energy discharged from any junior row of capacitors raises the voltage of the next senior row of capacitors until it equals the level within the storage capacitor(s) CaS. When the maximum voltage is reached in CaS, the charging process is stopped. The full amount of electric energy capable of being stored in the system is available to the user. These steps are happening in very short periods of time, at times infinitesimally short, depending on the available amounts of electric energy from the outside sources, necessitating the use of computers to manage the process.

The above describes only one possible way of charging of which the system is capable. Charging can be done also by individually charging each of the individual capacitors or groups.

Whether charging of individual capacitors is done individually or in groups, each capacitor of the Initial Charging area is charged to the ideally maximal charge and then the next capacitor in the same area is charged (or next group of them) until the last one is charged sufficiently.

The process continues from this point with the charging of the first capacitor of the first Intermediate area (or the first group of them), then the next one, etc., etc. When the last capacitor of the last Intermediate Charging area is fully charged, the switches SwNIM-1 through SwNIM-N are closed forming a row of capacitors in series, the switch for charging the last capacitor of this area is opened and no more charging of this capacitor (or group of capacitors) is done, the switch SwS (or switches SwS-1 through SwS-N when there is more than one of these capacitors in the system) is closed and the charge is released to the High Energy Density capacitors CaST (or CaST-1 through CaST-N).

When the voltage of the capacitor(s) CaS, or CaS-1 through CaS-N, reaches the maximum voltage possible by the design of the system, further charging of the High Energy Density Capacitor ceases and the system has maximum energy possible now available for the user.

Advantages of the Proposed Charging of this Electrical Energy System

1. Systems do not require transformers, particularly high voltage ones.
2. Low maintenance.
3. Minimal loss of energy from conventional electric supplier to the user.
4. Recharging time reduced due to the physical nature of the charging process. The time of recharging will depend, essentially, on the amount of commercially available energy.
5. Static system.
6. The system will use conventionally available sources of electric power for its operation.
7. The system will be able to satisfy the need of a wide range of users, from small ones to the largest electric power plants.
8. The system will release DC electricity needed for operation of many computers and telecommunication equipment. When electricity AC is needed, an appropriate AC converter will be added.
9. Released energy can be delivered in either low voltage or high voltage form.
10. It is possible to make the system portable and transportable.
11. Because this system will greatly decrease the current wastage of generated electrical energy (by whatever fossil fuel or hydroelectric means) it is anticipated that it will be widely used and will generate substantial sales in the present energy shortages. The system will pay for itself by either lowering the cost of production of electrical energy or, when used as U.P.S., by decreasing the cost of backup of various electric energy dependent processes.

D. Discharge of Electricity from the System

Electric energy collected in the High Density Electric Energy Capacitor has to be delivered to users at very specific voltage levels. In most cases it is to be delivered in a lower voltage form than that stored within the High Energy Density Capacitor.

Presently, when voltage has to be either heightened or lowered, transformers are used for that purpose. However, as previously stated, they are bulky, emit a wide electromagnetic field, loss of energy is substantial due to associated heat and they commonly fail due to significant currents they are constantly handling. The present invention resolves most of these problems.

By using DC currents, the present invention takes advantage of the principle that the voltage of two or more capacitors connected in series results in the sum of the voltages of these capacitors and connecting two or more capacitors in series results in the sum of the voltages of these capacitors. When capacitors are connected in series, the higher capacitance capacitor exhibits lower voltage and lower capacitance capacitor exhibits higher voltage. Thus, the exhibited voltages of the capacitors connected in series are inversely proportionate to the capacitance of the capacitors in the series.

The latter principle is used to distribute the voltage of the outgoing DC electricity to the user at the level they require. Given the appropriate combination of capacitors managed by computer control, it is possible to give the end users constant and specific voltage. Or it may be designed in such a way to give different voltages simultaneously to different end points users. Because capacitors connected together either rise in voltage when any one of them is charged, or exhibit a fall when any one of them is being discharged, measuring any the voltage in any single one of them gives very accurate information about the entire system of capacitors.

Our proposed Dividers may be constructed in two different modules:

Sets of two capacitors, one is a high capacitance capacitor; the other is a low capacitance capacitor. If more than one set is needed, each set will be connected in parallel mode with other sets and with the High Energy Density Capacitor (either CaS or CaS-1 through CaS-N when more than one is in the system.

Each set may release electricity separately and independently whether or not the other set is also releasing electricity. With additional capacitors properly used in this arrangement electricity may be released while still maintaining a constant voltage even though the voltage of the electricity coming from CaS may be changing.

In time the voltage of CaS will decrease due to the release of the energy to the user. However, the voltages available for release will be constant for a while, or with minimal fluctuations, despite voltage drop of the CaS. This configuration will not support a very long-term release of constant voltage electricity to the user.

The other construction for release of the electricity in the lower voltages ranges uses one or more capacitors of high capacitance and several of low capacitance. They are all connected in series. Depending what voltage is desired, the computer selects one of the high capacitance capacitors and one or more of the low capacitance capacitors connected in series. When a voltage sensor detects a lowering of the voltage at the high capacitance capacitor toward the critical voltage level for the user's needs (which indicates that the energy of the storage capacitor is decreasing), it will engage another low capacitance capacitor from this series to ensure sufficient voltage for the electricity needed by the end user. The computer uses a switching system which either opens or closes appropriate switches depending on the preset level of voltage for the outgoing electricity and the available voltage in CaS. The computer will either open or close specific switches to achieve the desired voltage level to be delivered to the user. This construction may be used also when the user requires electricity of different voltage levels simultaneously.

In each of these choices, programmed with the appropriate software, the computer will control the operation of all switches. It may react on inputs from the user or, if preprogrammed for specific voltage needs, it will receive impulses from the voltage and the electric flow (current) sensors at any area of the system, but most likely from the high capacitance capacitor of the Divider area. It will automatically cause the appropriate openings or closings of switches in the system to achieve the desired purpose.

As the voltage of the capacitors connected in parallel mode falls, or the same occurs with the serially connected capacitors, the computer selects a proper discharge setup so that user is supplied only with the appropriate voltage of the electric energy.

Electricity can be delivered in a low voltage or high voltage form depending on what voltage is needed by user.

When a source with a finite amount of energy is being drained of electricity during use, the computer program monitors the incoming voltage to capacitors in parallel mode (first choice) or of those connected in series (second choice) and uses switches to connect appropriate combinations of capacitors to allow the user to be supplied with electric energy at the most appropriate voltage level for the longest time possible.

When the user uses DC currents, it is supplied directly from the Divider. When AC is required, an appropriate converter is added to release electricity in AC form.

Advantages of the Proposed Voltage Divider for Release of Electricity (VDRE)

1. Systems do not require transformers, particularly high voltage ones.
2. Low maintenance.
3. Minimal loss of energy.
4. Static system.
5. System releases DC electricity needed for operation of computers and most telecommunication equipment. When AC is needed, an appropriate AC converter is added.
6. Released energy can be delivered in either low voltage or high voltage levels.
7. Due to the characteristics of the system, it will be widely used and will generate substantial sales in the present situation when only transformers are used for that purpose.

Charging the System

Initial Charging Pulse Method (In this part it is assumed that more than one Intermediary Charging area is used, and more than one storage capacitor is part of the system. It is also assumed that a large amount of energy is available from the outside source.)

Each Intermediate Charging row of capacitors has the capability of being charged with the same amount of energy as the Initial Charging area but always to higher voltage levels. Each new "pulse" delivered to CaS area will increase their voltage level until the storage system reaches the ideal preprogrammed high voltage and consequently high energy level.

BRIEF DESCRIPTION OF THE DRAWINGS

The drawings attached.

Figure 1:
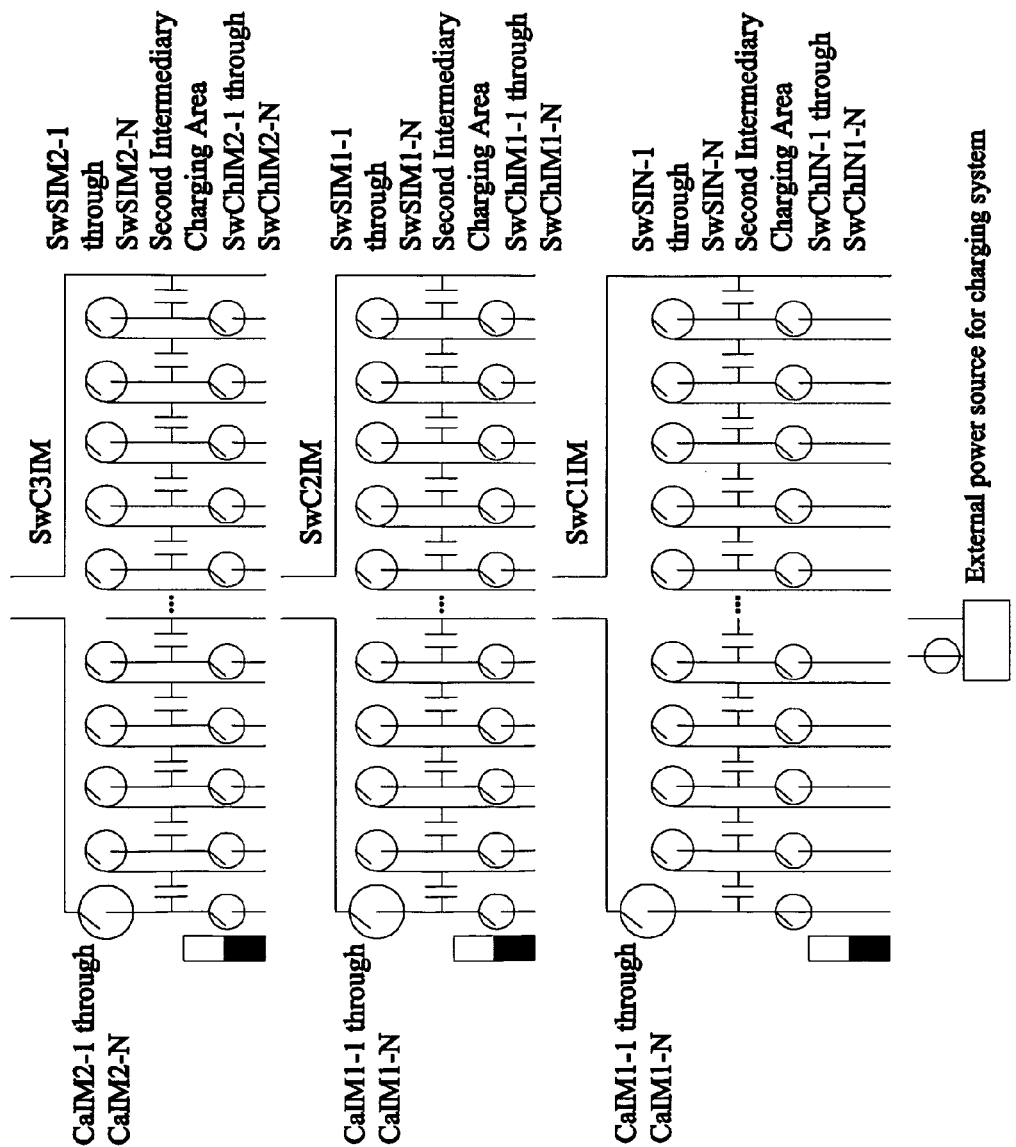
FIGS. 1 to 11, illustrate the operating sequence described hereunder.
Figure 2:
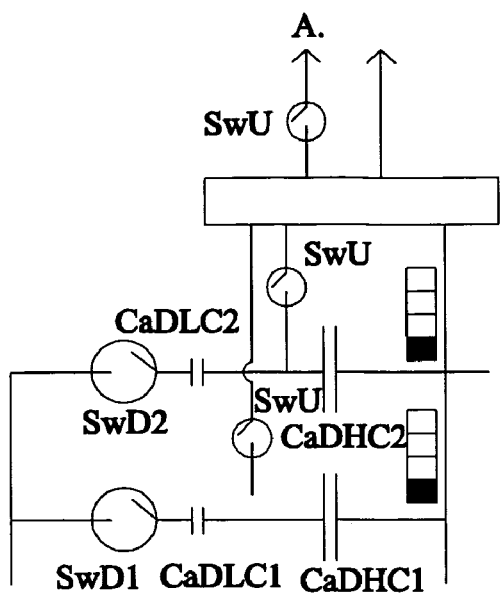
Figure 2:
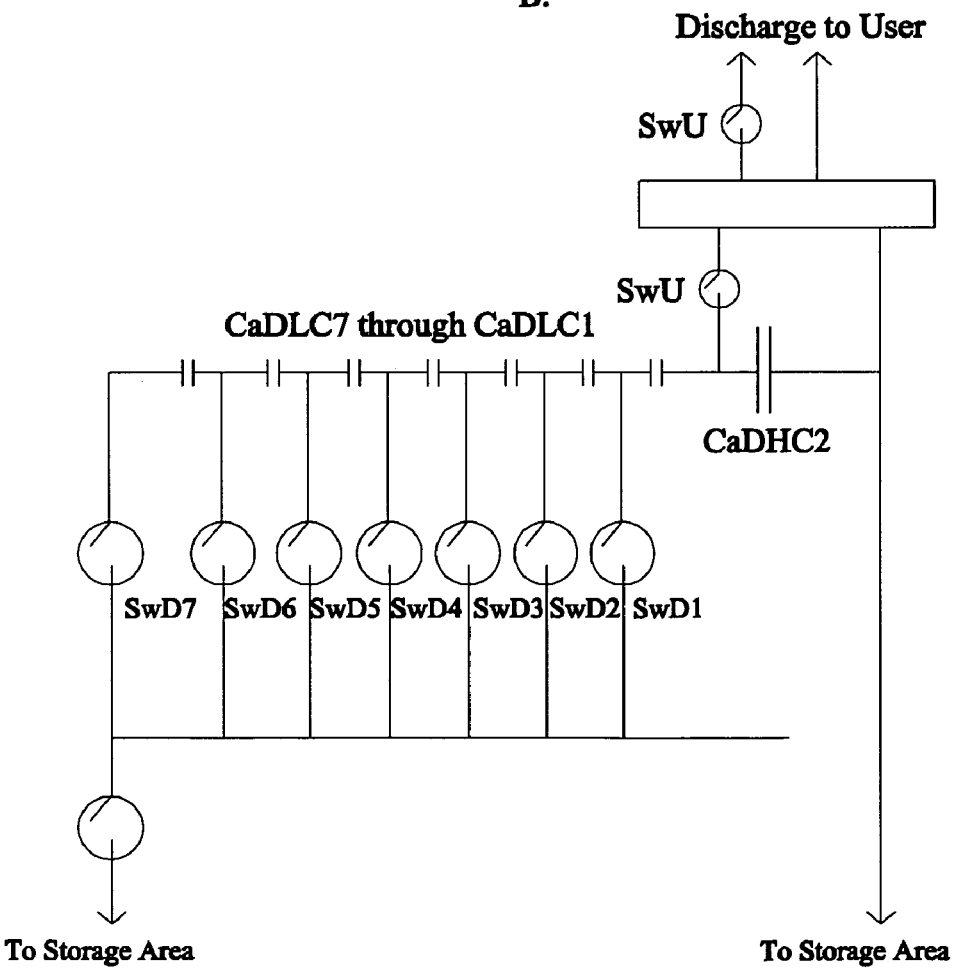
Figure 3:
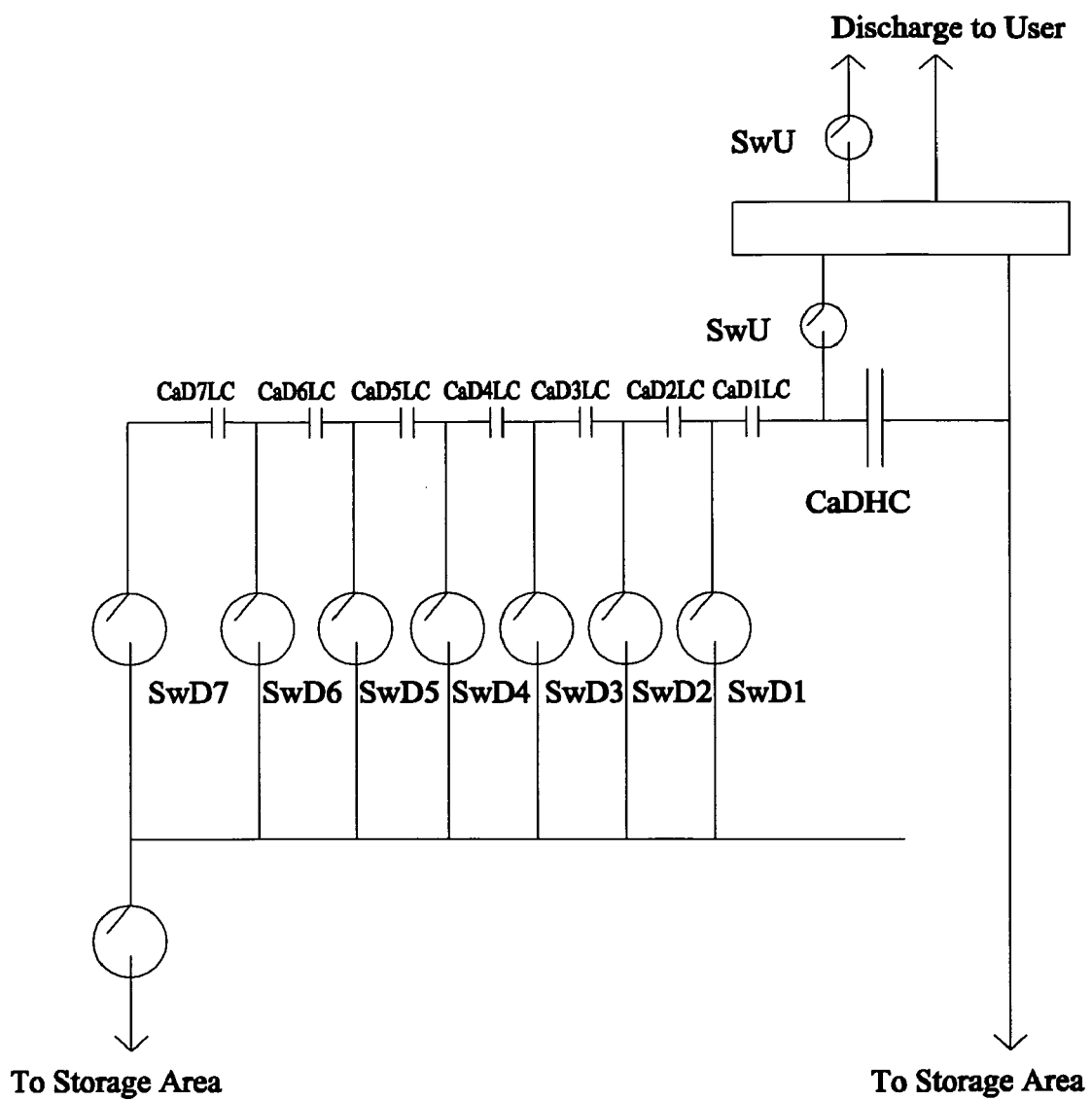
Figure 4:
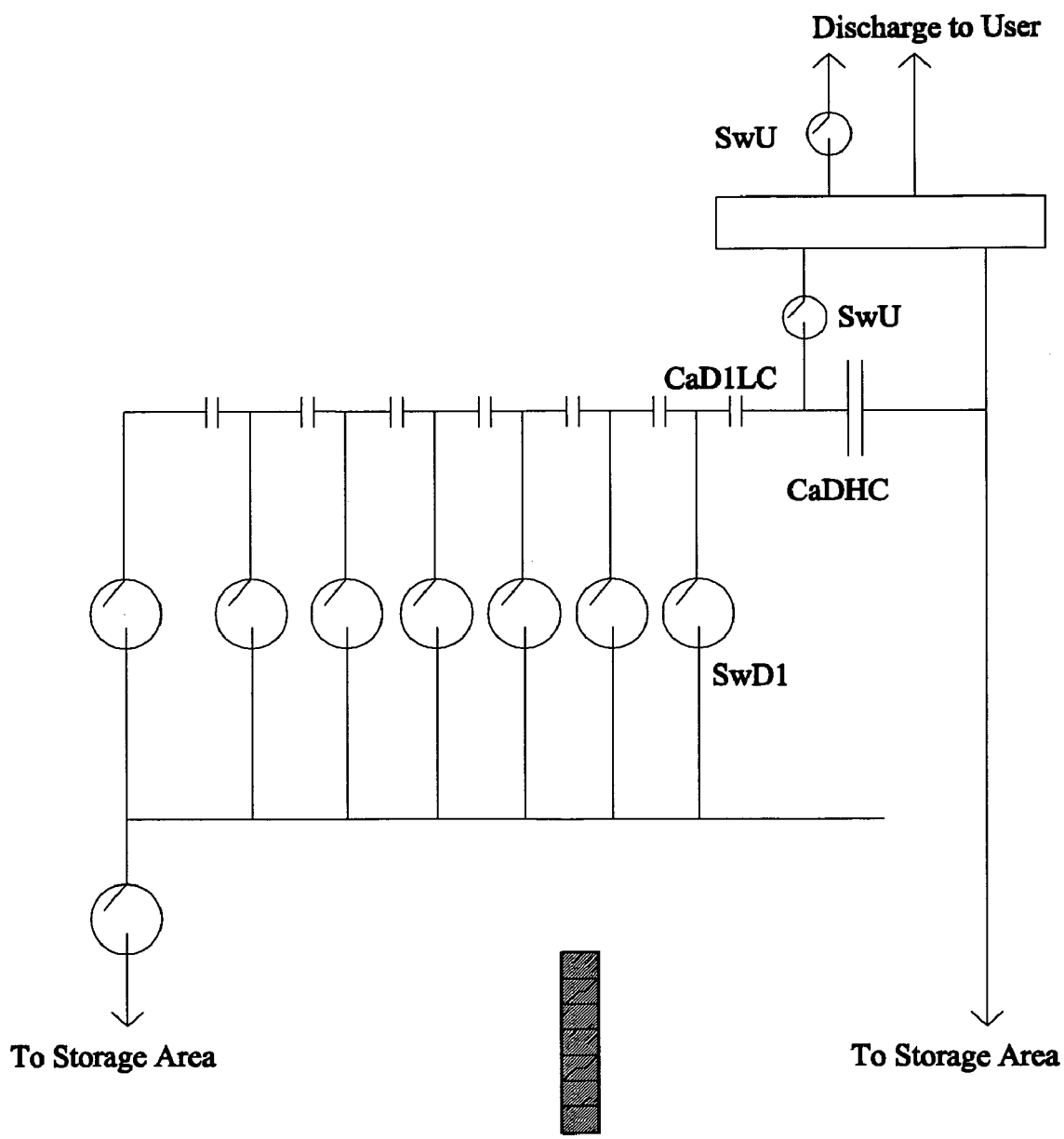
Figure 5:
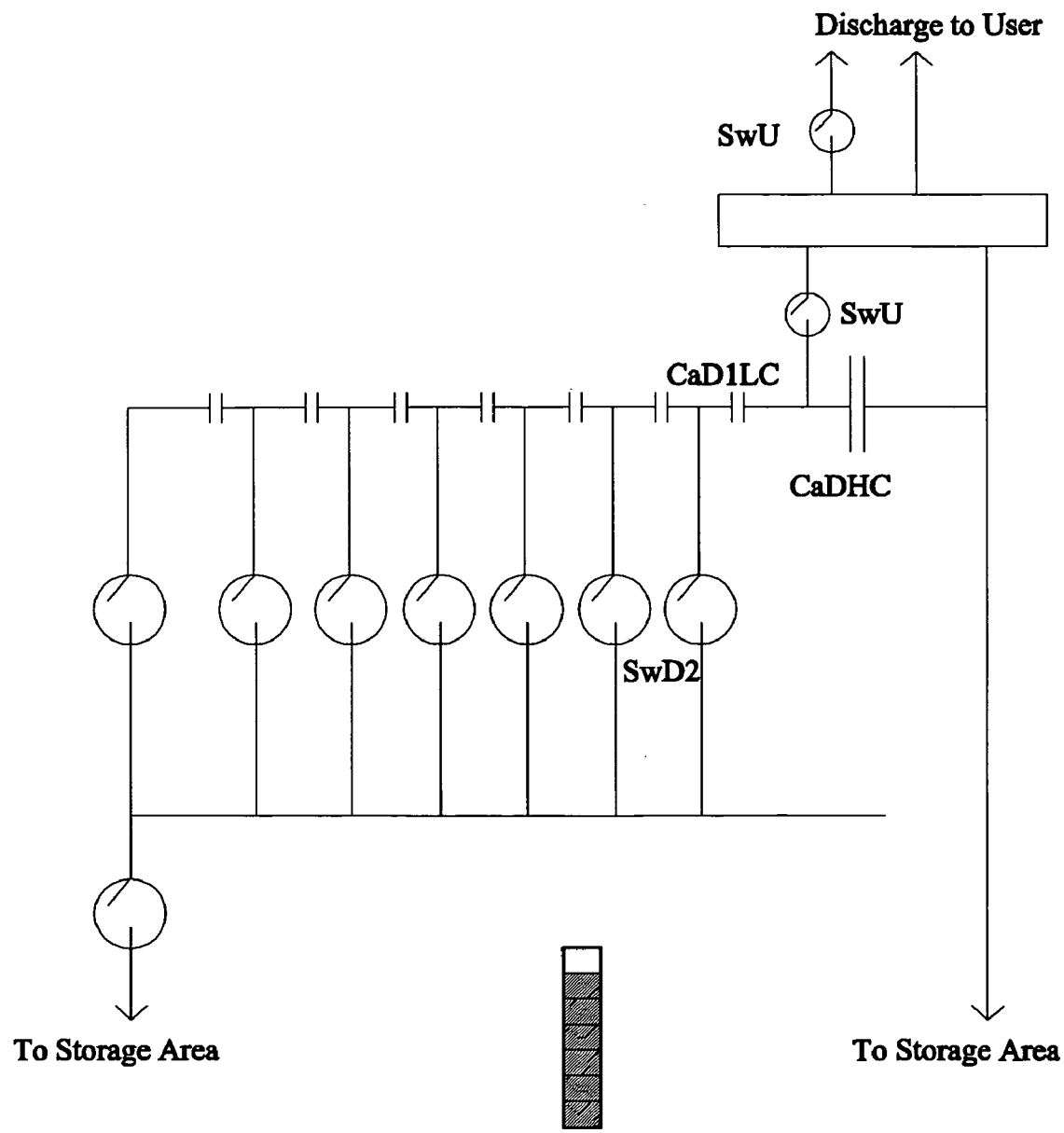
Figure 6:
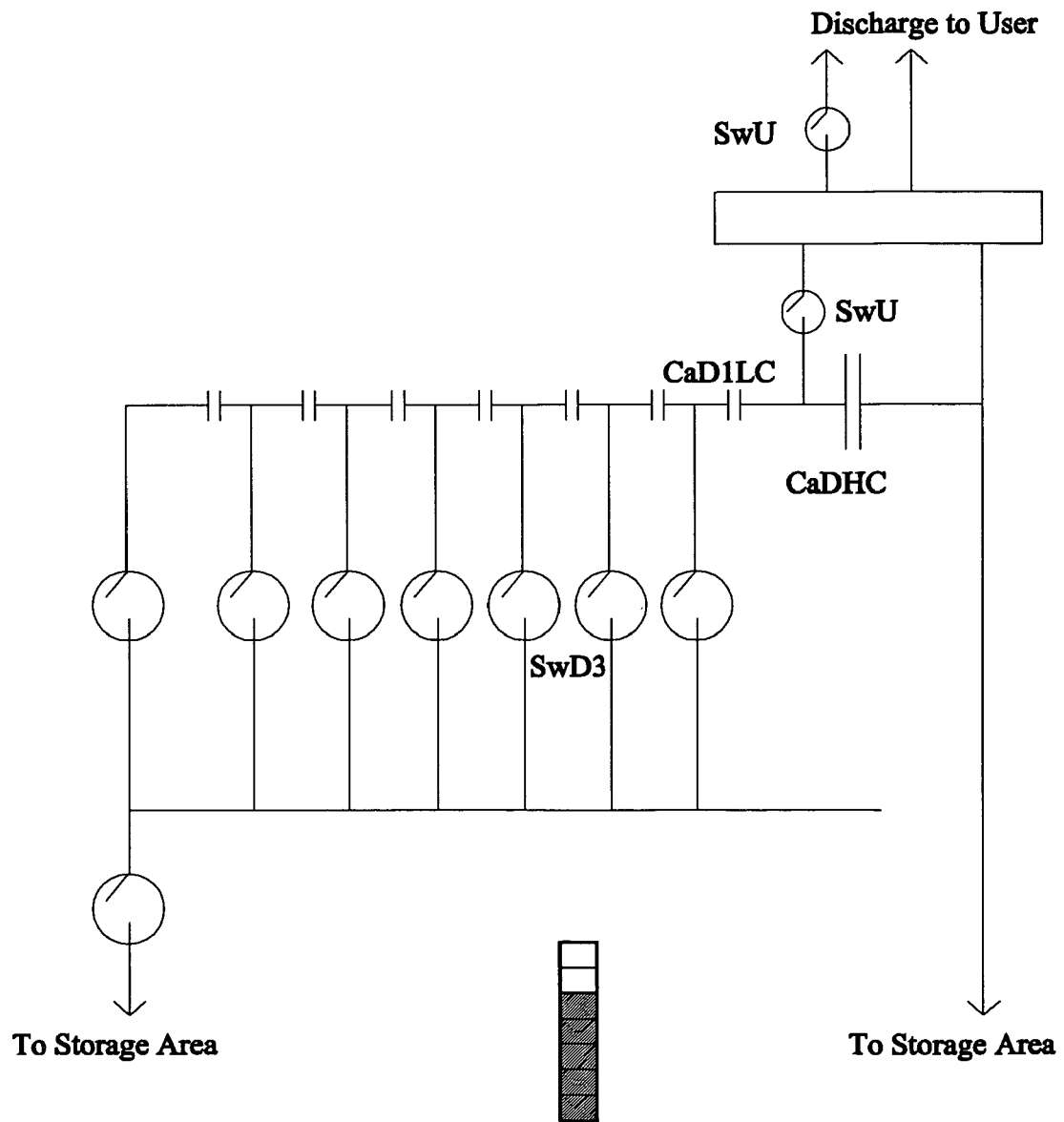
Figure 7:
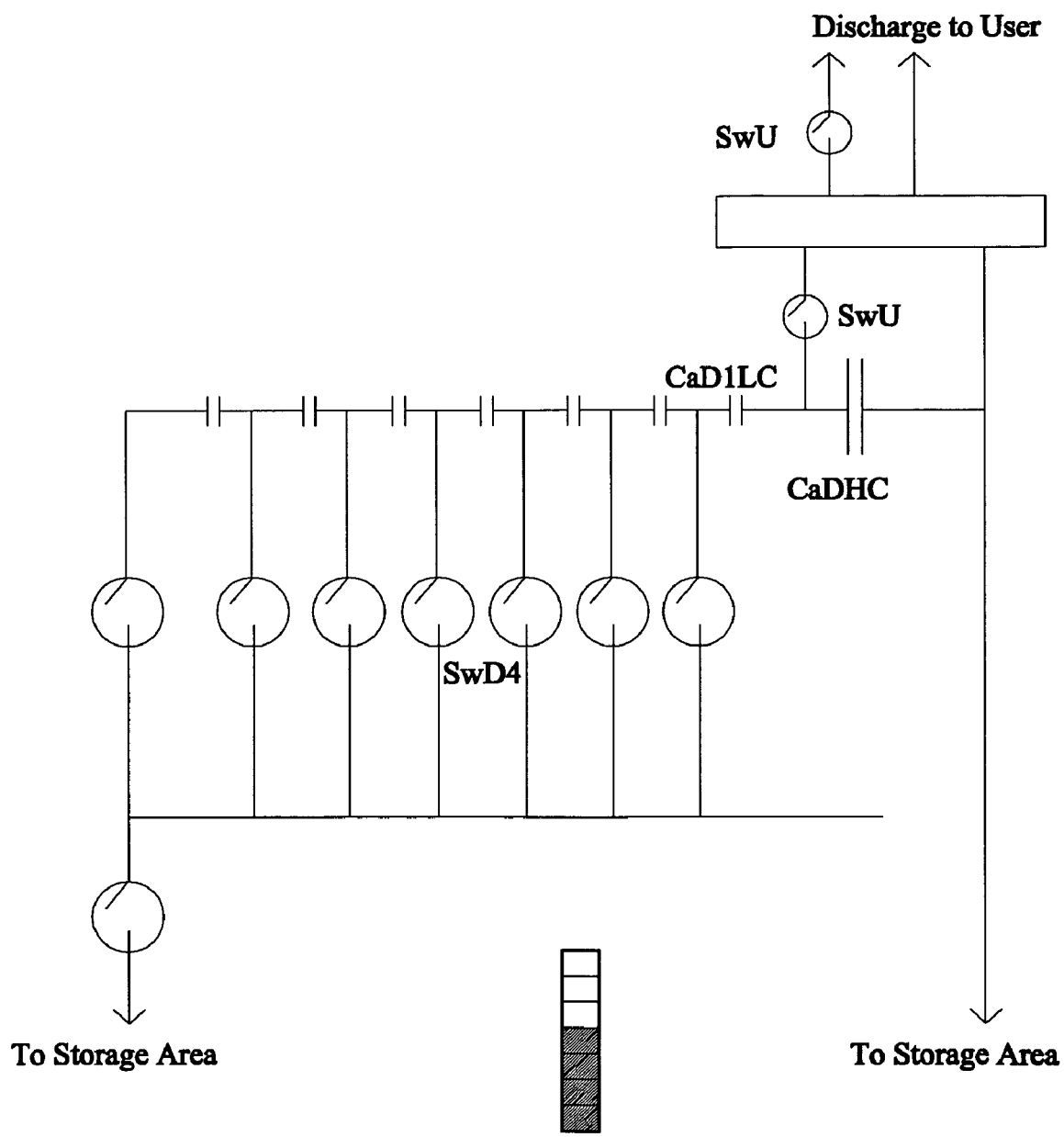
Figure 8:
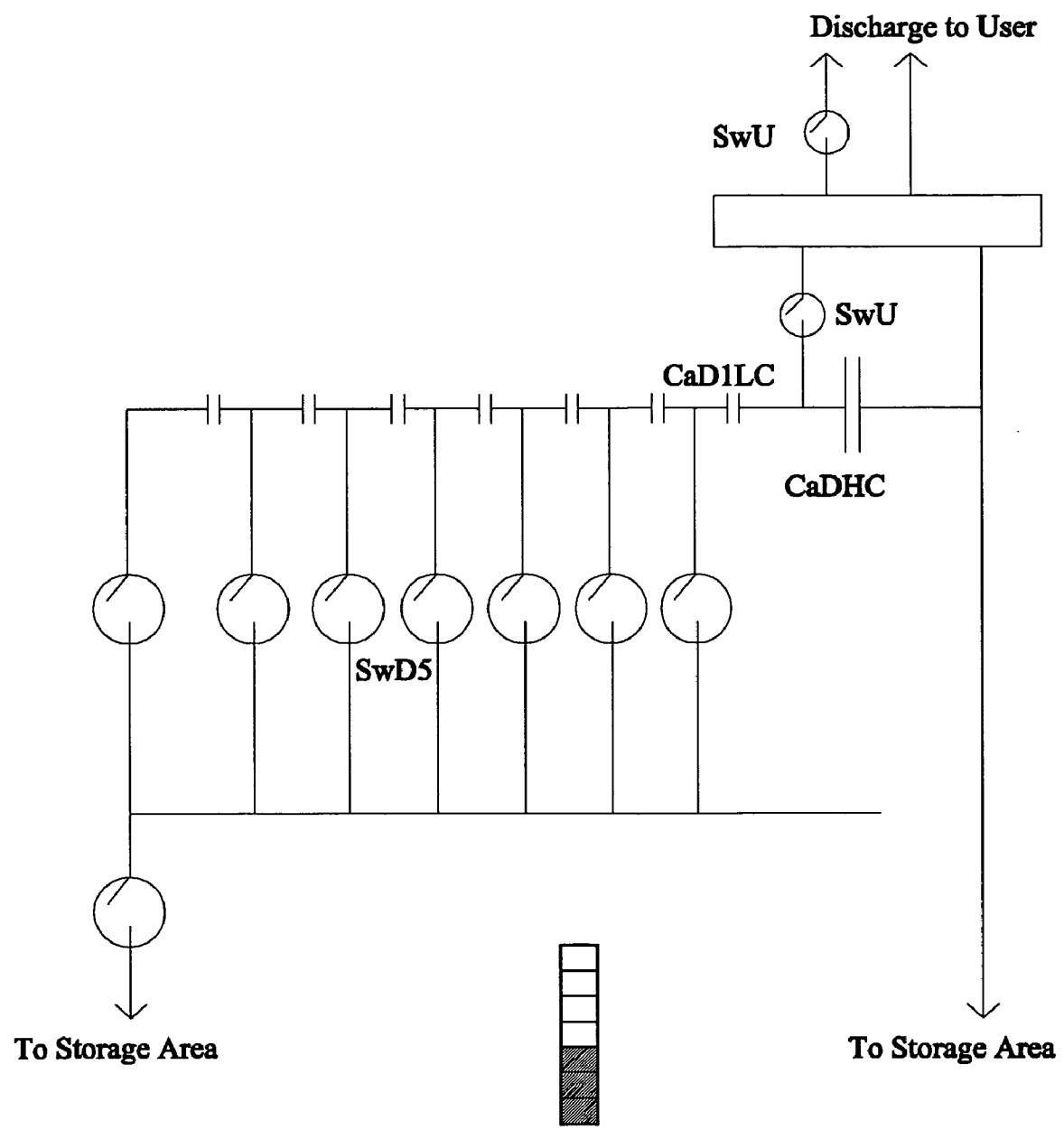
Figure 9:
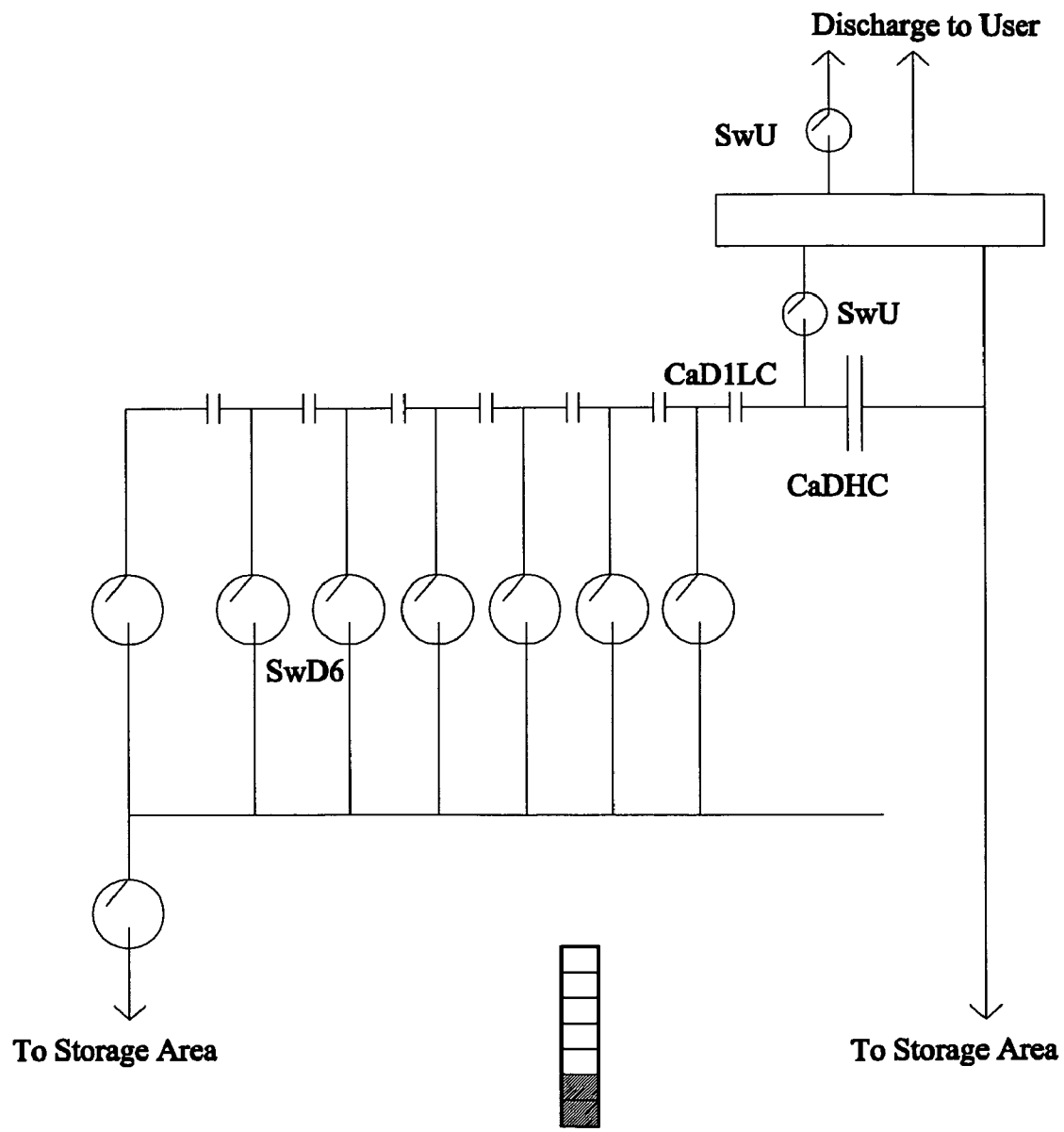
Figure 10:
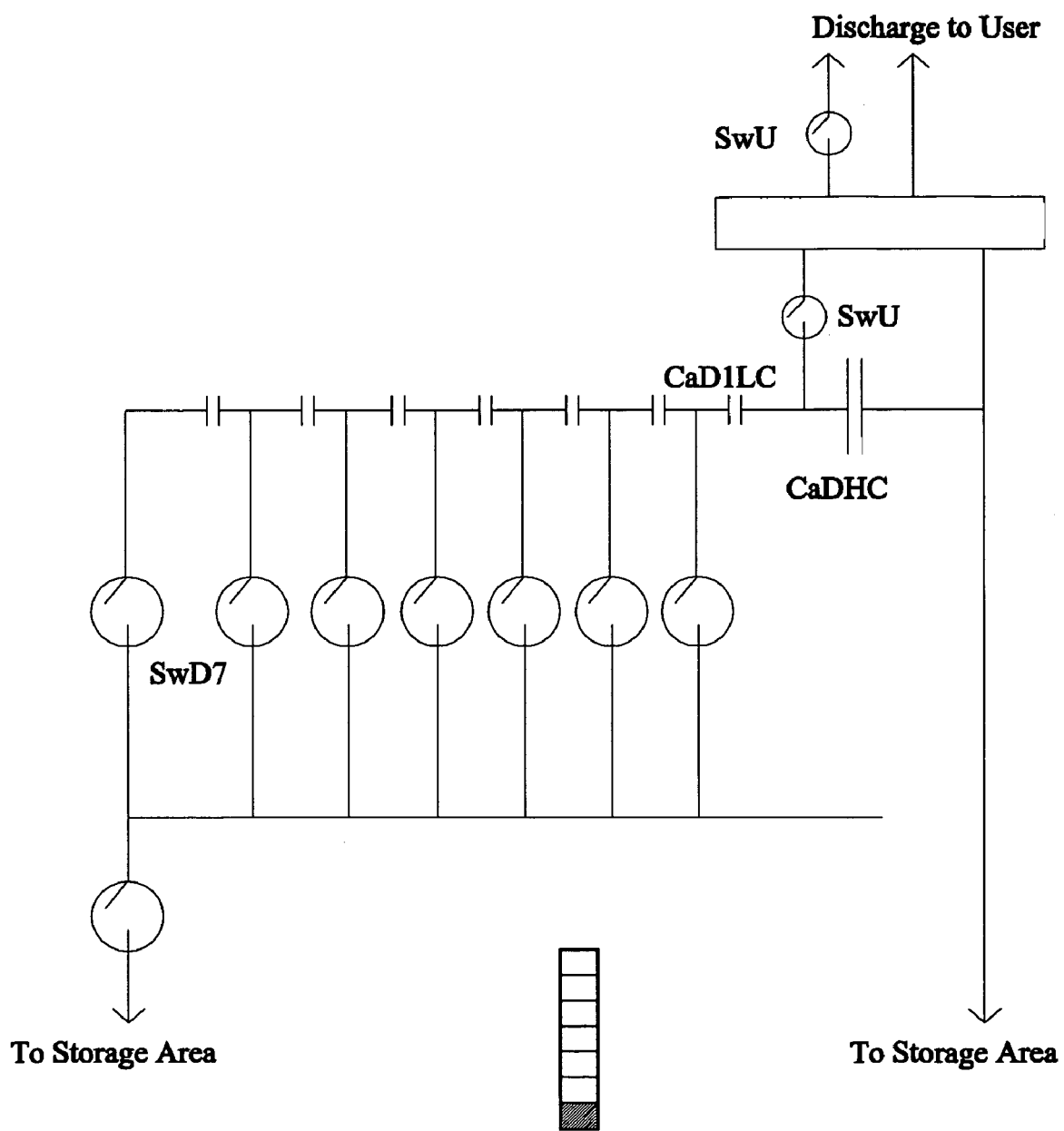
Figure 11:
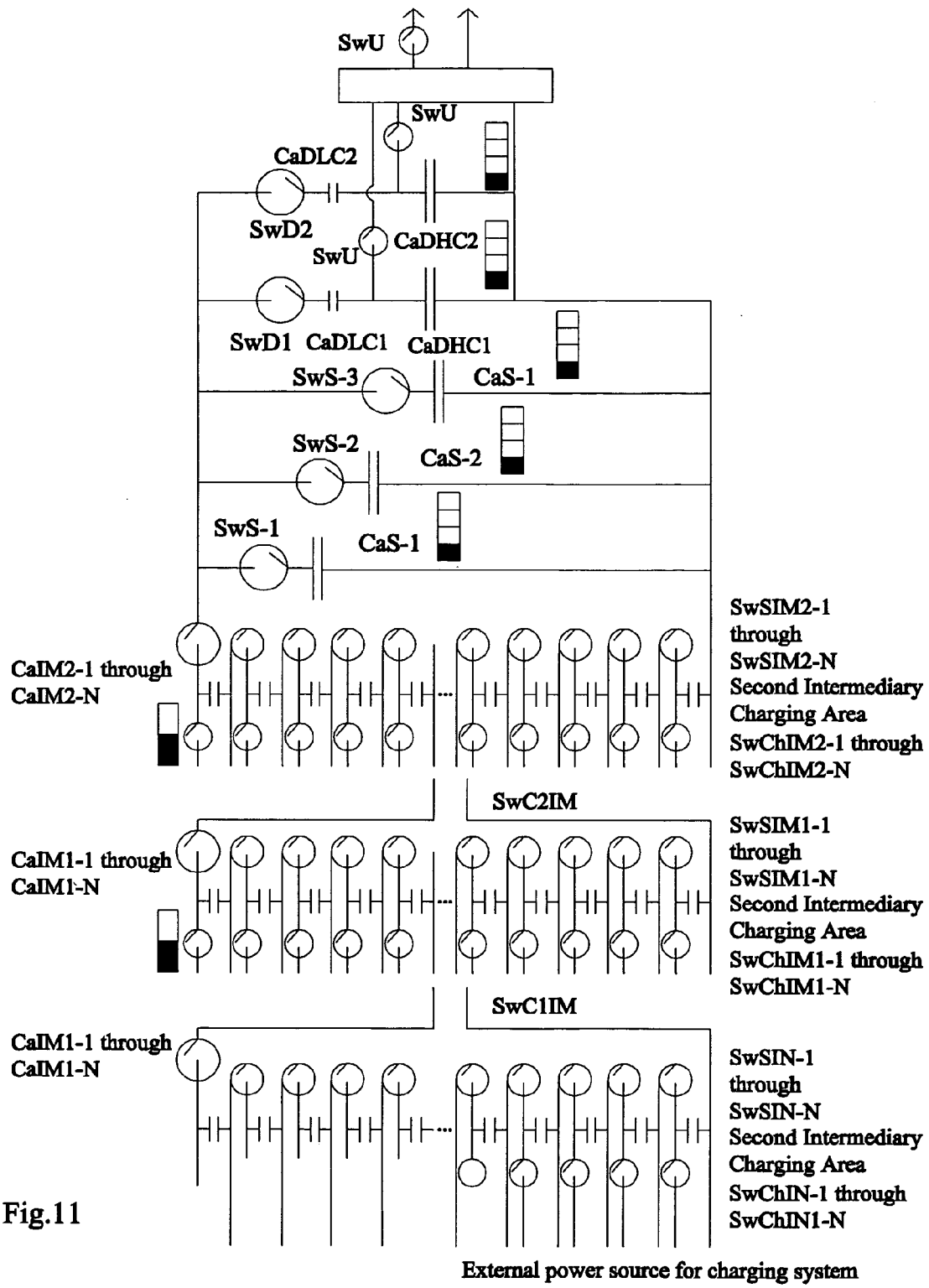

Abbreviations used: C—Switch Closed and current possible
O—Switch Opened and no current possible
CH—Capacitor Charging
DIS—Capacitor Discharging
STCH—Charge of capacitor as per previous charge
L—Low Charge

Starting Condition

System is not Charged

Switches: Capacitors:
SwChIN-1 through SwChIN-N. O
SwSIN-1 through SwSIN-N. O
CaIM1-1 through CaIM1-N L
SwChIM1-1 through SwChIM1-N O CaIM2-1 through CaIM2-N L
SwChIM2-1 through SwChIM2-N O CaIM3-1 through CaIM3-N L
SwChIM3-1 through SwChIM3-N O CaIMN-1 through CaIMN-N L
SwChIMN-1 through SwChIMN-N O
SwSIM1-1 through SwSIM1-N O CaS-1 through CaS-N L
SwSIM2-1 through SwSIM2-N O
SwSIM3-1 through SwSIM3-N O CaDHC-1 through CaDHC-N L
SwSIMN-1 through SwSIMN-N O CaDLC-1 through CaDLC-N L
SwC1IM. O
SwC2IM O
SwC3IM O
SwCNIM O
SwS-1 through SwS-N O When charging of the system is ordered, the computer begins the process of opening or closing switches and charging and discharging of the appropriate capacitors. The process is repeated until the storage capacitors are fully charged and exhibit maximal voltage they are rated for. In this example four Intermediate Charging areas are used: IM1, IM2, IM3 and IMN. Obviously, the system may have smaller number of them or more of them.

When an area is fully charged and no current is present between either the source of energy for charging or between two of the Charging areas or between the charging areas and the storage capacitors, the computer operating the system automatically initiates the next step.

Step #1

SwChIN-1 through SwChIN-N C CaIN-1 through CaIN-N CH
SwSIN-1 through SwSIN-N. O
CaIM1-1 through CaIM1-N L
SwChIM1-1 through SwChIM1-N O CaIM2-1 through CaIM2-N L
SwChIM2-1 through SwChIM2-N O CaIM3-1 through CaIM3-N L
SwChIM3-1 through SwChIM3-N O CaIMN-1 through CaIMN-N L
SwChIMN-1 through SwChIMN-N O
SwSIM1-1 through SwSIM1-N O CaS-1 through CaS-N L
SwSIM2-1 through SwSIM2-N O
SwSIM3-1 through SwSIM3-N O CaDHC-1 through CaDHC-N L
SwSIMN-1 through SwSIMN-N O CaDLC-1 through CaDLC-N L
SwC1IM. O
SwC2IM O
SwC3IM O
SwCNIM O
SwS-1 through SwS-N O

Step #2

SwChIN-1 through SwChIN-N O CaIN-1 through CaIN-N DIS
SwSIN-1 through SwSIN-N. C
CaIM1-1 through CaIM1-N CH
SwChIM1-1 through SwChIM1-N C CaIM2-1 through CaIM2-N L
SwChIM2-1 through SwChIM2-N O CaIM3-1 through CaIM3-N L
SwChIM3-1 through SwChIM3-N O CaIMN-1 through CaS-N L
SwChIMN-1 through SwChIMN-N O
SwSIM1-1 through SwSIM1-N O CaS-1 through CaS-N L
SwSIM2-1 through SwSIM2-N O
SwSIM3-1 through SwSIM3-N O CaDHC-1 through CaDHC-N L
SwSIMN-1 through SwSIMN-N O CaDLC-1 through CaDLC-N L
SwC1IM. C
SwC2IM O
SwC3IM O
SwCNIM O
SwS-1 through SwS-N O

Step #3

SwChIN-1 through SwChIN-N C CaIN-1 through CaIN-N CH
SwSIN-1 through SwSIN-N. O
CaIM1-1 through CaIM1-N DIS
SwChIM1-1 through SwChIM1-N O CaIM2-1 through CaIM2-N CH
SwChIM-1 through SwChIM2-N C CaIM3-1 through CaIM3-N L
SwChIM3-1 through SwChIM3-N O CaIMN-1 through CaIMN-N L
SwChIMN-1 through SwChIMN-N O
SwSIM1-1 through SwSIM1-N C CaS-1 through CaS-N L
SwSIM2-1 through SwSIM2-N O
SwSIM3-1 through SwSIM3-N O CaDHC-1 through CaDHC-N L
SwSIMN-1 through SwSIMN-N O CaDLC-1 through CaDLC-N L
SwC1IM. O
SwC2IM C
SwC3IM O
SwCNIM O
SwS-1 through SwS-N O

Step #4

SwChIN-1 through SwChIN-N O CaIN-1 through CaIN-N DIS
SwSIN-1 through SwSIN-N. C
CaIM1-1 through CaIM1-N CH
SwChIM1-1 through SwChIM1-N C CaIM2-1 through CaIM2-N DIS
SwChIM2-1 through SwChIM2-N O CaIM3-1 through CaIM3-N CH
SwChIM3-1 through SwChIM3-N C CaIMN-1 through CaIMN-N L
SwChIMN-1 through SwChIMN-N O
SwSIM1-1 through SwSIM1-N O CaS-1 through CaS-N L
SwSIM2-1 through SwSIM2-N C
SwSIM3-1 through SwSIM3-N O CaDHC-1 through CaDHC-N L
SwSIMN-1 through SwSIMN-N O CaDLC-1 through CaDLC-N L
SwC1IM. C
SwC2IM O
SwC3IM C
SwCNIM O
SwS-1 through SwS-N O

Step #5

SwChIN-1 through SwChIN-N C CaIN-1 through CaIN-N CH
SwSIN-1 through SwSIN-N. O
CaIM1-1 through CaIM1-N DIS
SwChIM1-1 through SwChIM1-N O CaIM2-1 through CaIM2-N CH
SwChIM2-1 through SwChIM2-N C CaIM3-1 through CaIM3-N DIS
SwChIM3-1 through SwChIM3-N O CaIMN-1 through CaIMN-N CH
SwChIMN-1 through SwChIMN-N C
SwSIM1-1 through SwSIM1-N C CaS-1 through CaS-N L
SwSIM2-1 through SwSIM2-N O
SwSIM3-1 through SwSIM3-N C CaDHC-1 through CaDHC-N L
SwSIMN-1 through SwSIMN-N O CaDLC-1 through CaDLC-N L
SwC1IM. O
SwC2IM C
SwC3IM O
SwCNIM C
SwS-1 through SwS-N O

Step #6

SwChIN-1 through SwChIN-N O CaIN-1 through CaIN-N DIS
SwSIN-1 through SwSIN-N. C
CaIM1-1 through CaIM1-N CH
SwChIM1-1 through SwChIM1-N C CaIM2-1 through CaIM2-N DIS
SwChIM2-1 through SwChIM2-N O CaIM3-1 through CaIM3-N CH
SwChIM3-1 through SwChIM3-N C CaIMN-1 through CaIMN-N DIS
SwChIMN-1 through SwChIMN-N O
SwSIM1-1 through SwSIM1-N O CaS-1 through CaS-N CH
SwSIM2-1 through SwSIM2-N C
SwSIM3-1 through SwSIM3-N O CaDHC-1 through CaDHC-N CH
SwSIMN-1 through SwSIMN-N C CaDLC-1 through CaDLC-N CH
SwC1IM. C
SwC2IM O
SwC3IM C
SwCNIM O
SwS-1 through SwS-N C

Step #7

SwChIN-1 through SwChIN-N C CaIN-1 through CaIN-N CH
SwSIN-1 through SwSIN-N. O
CaIM1-1 through CaIM1-N DIS
SwChIM1-1 through SwChIM1-N O CaIM2-1 through CaIM2-N CH
SwChIM2-1 through SwChIM2-N C CaIM3-1 through CaIM3-N DIS
SwChIM3-1 through SwChIM3-N O CaIMN-1 through CaIMN-N CH
SwChIMN-1 through SwChIMN-N C
SwSIM1-1 through SwSIM1-N C CaS-1 through CaS-N STCH
SwSIM2-1 through SwSIM2-N O
SwSIM3-1 through SwSIM3-N C CaDHC-1 through CaDHC-N STCH
SwSIMN-1 through SwSIMN-N O CaDLC-1 through CaDLC-N STCH
SwC1IM. O
SwC2IM C
SwC3IM O
SwCNIM C
SwS-1 through SwS-N O

Step #8

SwChIN-1 through SwChIN-N O CaIN-1 through CaIN-N DIS
SwSIN-1 through SwSIN-N. C
CaIM1-1 through CaIM1-N CH
SwChIM1-1 through SwChIM1-N C CaIM2-1 through CaIM2-N DIS
SwChIM2-1 through SwChIM2-N O CaIM3-1 through CaIM3-N CH
SwChIM3-1 through SwChIM3-N C CaIMN-1 through CaIMN-N DIS
SwChIMN-1 through SwChIMN-N O
SwSIM1-1 through SwSIM1-N O CaS-1 through CaS-N CH
SwSIM2-1 through SwSIM2-N C
SwSIM3-1 through SwSIM3-N O CaDHC-1 through CaDHC-N CH
SwSIMN-1 through SwSIMN-N C CaDLC-1 through CaDLC-N CH
SwC1IM. C
SwC2IM O
SwC3IM C
SwCNIM O
SwS-1 through SwS-N C

Step #9

SwChIN-1 through SwChIN-N C CaIN-1 through CaIN-N CH
SwSIN-1 through SwSIN-N. O
CaIM1-1 through CaIM I-N DIS
SwChIM1-1 through SwChIM1-N O CaIM2-1 through CaIM2-N CH
SwChIM2-1 through SwChIM2-N C CaIM3-1 through CaIM3-N DIS
SwChIM3-1 through SwChIM3-N O CaIMN-1 through CaIMN-N CH
SwChIMN-1 through SwChIMN-N C
SwSIM1-1 through SwSIM1-N C CaS-1 through CaS-N STCH
SwSIM2-1 through SwSIM2-N O
SwSIM3-1 through SwSIM3-N C CaDHC-1 through CaDHC-N STCH
SwSIMN-1 through SwSIMN-N O CaDLC-1 through CaDLC-N STCH
SwC1IM. O
SwC2IM C
SwC3IM O
SwCNIM C
SwS-1 through SwS-N O

Step #10

SwChIN-1 through SwChIN-N O CaIN-1 through CaIN-N DIS
SwSIN-1 through SwSIN-N. C
CaIM1-1 through CaIM1-N CH
SwChIM1-1 through SwChIM1-N C CaIM2-1 through CaIM2-N DIS
SwChIM2-1 through SwChIM2-N O CaIM3-1 through CaIM3-N CH
SwChIM3-1 through SwChIM3-N C CaIMN-1 through CaIMN-N DIS
SwChIMN-1 through SwChIMN-N O
SwSIM1-1 through SwSIM1-N O CaS-1 through CaS-N CH
SwSIM-1 through SwSIM2-N C
SwSIM3-1 through SwSIM3-N O CaDHC-1 through CaDHC-N CH
SwSIMN-1 through SwSIMN-N C CaDLC-1 through CaDLC-N CH
SwC1IM. C
SwC2IM O
SwC3IM C
SwCNIM O
SwS-1 through SwS-N C These Steps are repeated until capacitors of the storage area CaS-1 through CaS-N (along with the high capacitance capacitors CaDHC-1 through CaDHC-N and low capacitance capacitors of the Discharge area) reach the rated maximal voltage.

Discharging the System

Discharging the electricity from the storage capacitor may be done using the first choice described above.

A set of low capacitance and high capacitance capacitors will provide specific voltage for users when the voltage of the storage capacitor and the discharge capacitors are properly calculated. This will provide a minor decrease of the voltage range within the storage capacitor while still maintaining the proper voltage to be released to the users.

This arrangement may be augmented with the addition of more similar capacitors set up as parallel sets which will produce increased capacitance of the high capacitance capacitors thereby maintaining a constant capacitance of the high capacitance capacitor of the discharge system.

To maintain low fluctuations in voltage to the user, several of these systems may be employed and connected in parallel, (always being used individually), and as the voltage of the storage capacitor reduces, a set of discharge capacitors with higher capacitance capacitor component may be used.

These computer instructions will be based on the example of the discharge system which is composed of three sets of high capacitance and low capacitance capacitors. As the voltage of the storage capacitors reduces, the next set for discharge will be used which will have a higher capacitance than the high capacitance capacitor of the discharge system. This will ensure that the low capacitance capacitor will continue to release electricity at an acceptable level.

When the voltage of the storage capacitor falls to the degree that the voltage of the third set of discharge capacitors is reduced below the acceptable level, and the system is not able to release electricity to the user any more, the system will stop supplying the user with electricity and the storage capacitor(s) will have to be recharged to the optimal level again and discharge will start again from the first set of discharge capacitors.

A. In the following example the electricity is released to the user through the high capacitance capacitor of the discharge set, thus releasing constant low voltage

Components of the Discharge System

Switches Capacitors Condition the voltage of the high capacitance capacitor for discharge to the user related to the voltage of the storage capacitor(s):

SwD1 CaD1HC
CaD1LC
SwD2 CaD2HC
CaD2LC
SwD3 CaD3HC
CaD3LC

Condition when the storage capacitor is fully charged (highest voltage possible for the rating of this capacitor):

SwD1 C CaD1HC Adequate
CaD1LC Function only as part of the Divider
SwD2 O CaD2HC Stand-by position
CaD2LC
SwD3 O CaD3HC Stand-by position
CaD3LC Condition when the storage capacitor is decreasing in its voltage (thus decreasing in the amount of the stored energy):

SwD1 O CaD1HC Switch was opened due to inadequate voltage in this capacitor
CaD1LC
SwD2 C CaD2HC Adequate voltage for the User's needs
CaD2LC Function only as part of the Divider
SwD3 O CaD3HC Stand-by position
CaD3LC Condition when the storage capacitor is further decreasing in its voltage (thus decreasing even more in the amount of stored energy):

SwD1 O CaD1HC Switch was opened due to inadequate voltage in this capacitor
CaD1LC
SwD2 O CaD2HC Switch was opened due to inadequate voltage in this capacitor CaD2LC
SwD3 C CaD3HC Adequate voltage for the User's needs
CaD3LC Function only as part of the Divider
Condition when the storage capacitor is further decreasing in its voltage and can not provide a high enough voltage in the Divider to provide adequate voltage for the user's needs. The system must be recharged at that point:
SwD1 O CaD1HC Switch was opened due to inadequate voltage in this capacitor
CaD1LC
SwD2 O CaD2HC Switch was opened due to inadequate voltage in this capacitor
CaD2LC
SwD3 O CaD3HC Switch was opened due to inadequate voltage in this capacitor
CaD3LC B. A further example of a Divider is one that is constructed of several low capacitance capacitors and one high capacitance capacitors connected in series.

In this example we will assume a situation wherein there are seven low capacitance capacitors and one high capacitance capacitor. They will be used in different combinations and will release a fairly constant voltage to the user. This system will be used when a constant supply of electricity with low variation is essential to the users.

Switches SwD function to engage more and more low voltage capacitors as they keep closing (in addition to the high capacitance capacitor from where the electricity is being released to the user (See pictures #2 to #8.).

In our example SwD-1 engages the first low capacitance capacitor, then SwD-2, then SwD-3 etc. In this way, the electricity which started at the upper levels of acceptable voltages for the user is corrected when it drops (when the voltage in the storage capacitor drops to discharge energy from the storage capacitor). When it drops again and approaches the lower levels of acceptable voltage, the next low capacitance capacitor engages and the voltage needs of the user are again satisfied.

The opposite process happens when the voltage of the storage capacitor(s) starts rising.

Components of the Discharge System

Switches Capacitors: Conditions the voltage of the high Capacitance capacitor for discharge to the user related to the voltage of the storage capacitor(s):
Condition of Voltage:
SwD1 CaD1HC
CaD1LC
SwD2 CaD2HC
SwD3 CaD3HC
SwD4 CaD4HC
SwD6 CaD5HC
SwD6 CaD6HC
SwD7 CaD7HC Initially, the storage capacitor is going to be fully charged and the voltage delivered to the discharge unit will be at the highest level. As the user "drains" the electricity from the storage capacitor, different capacitors are employed in the discharge setup. In this fashion, high capacitance capacitors deliver the appropriate voltage to the user by engaging more and more low capacitance capacitors as the voltage in the storage capacitor falls. There are several low capacitance capacitors available for that purpose, but in this illustration only one high capacitance capacitor is used in the Divider.

In other designs there may be other high capacitance capacitors present, either for discharging different low voltages of electricity or for different configurations of the divider.

As voltages in the storage area fall, and the voltage released to the user approaches the lowest acceptable level, more and more of the low capacitance capacitors are used to assure the appropriate voltage in the high capacitance capacitor which discharges the electricity to the user.

Step 1

SwD 1 C CaDHC Voltage level adequate for the user's needs.
CaD1LC This is only low capacitance capacitor now used in the Discharge system.
SwD2 O CaD2LC Not used for that level of voltage.
SwD3 O CaD3LC Not used for that level of voltage.
SwD4 O CaD4LC Not used for that level of voltage.
SwD6 O CaD5LC Not used for that level of voltage.
SwD6 O CaD6LC Not used for that level of voltage.
SwD7 O CaD7LC Not used for that level of voltage.
Voltage of the storage capacitors falls.

Step 2

SwD1 O CaDHC Voltage levels again adequate for the user's needs.
CaD1LC This is a part of the Discharge system.
SwD2 C CaD2LC This capacitor was added to the Divider.
SwD3 O CaD3LC Not used for that level of voltage.
SwD4 O CaD4LC Not used for that level of voltage.
SwD6 O CaD5LC Not used for that level of voltage.
SwD6 O CaD6LC Not used for that level of voltage.
SwD7 O CaD7LC Not used for that level of voltage.
Voltage of the storage capacitors falls.

Step 3

SwD1 O CaDHC Voltage level again adequate for the user's needs.
CaD1LC This is a part of the Discharge system.
SwD2 O CaD2LC This is a part of the Discharge system.
SwD3 C CaD3LC This capacitor was added to the Divider.
SwD4 O CaD4LC Not used for that level of voltage.
SwD6 O CaD5LC Not used for that level of voltage.
SwD6 O CaD6LC Not used for that level of voltage.
SwD7 O CaD7LC Not used for that level of voltage.
Voltage of the storage capacitors falls further.

Step 4

SwD1 O CaDHC Voltage level again adequate for the user's needs.
CaD1LC This is a part of the Discharge system.
SwD2 O CaD2LC This is a part of the Discharge system.
SwD3 O CaD3LC This is a part of the Discharge system.
SwD4 C CaD4LC This was added to the Divider.
SwD6 O CaD5LC Not used for that level of voltage.
SwD6 O CaD6LC Not used for that level of voltage.
SwD7 O CaD7LC Not used for that level of voltage.
Voltage of the storage capacitors falls further.

Step 5

SwD1 O CaDHC Voltage level again adequate for the user's needs.
O CaD1LC This is a part of the Discharge system.
SwD2 O CaD2LC This is a part of the Discharge system.
SwD3 O CaD3LC This is a part of the Discharge system.
SwD4 O CaD4LC This is a part of the Discharge system.
SwD6 C CaD5LC This was added to the Divider.
SwD6 O CaD6LC Not used for that level of voltage.
SwD7 O CaD7LC Not used for that level of voltage.
Voltage of the storage capacitors falls further.

Step 6

SwD1 O CaDHC Voltage level again adequate for the user's needs.
CaD1LC This is a part of the Discharge system.
SwD2 O CaD2LC This is a part of the Discharge system.
SwD3 O CaD3LC This is a part of the Discharge system.
SwD4 O CaD4LC This is a part of the Discharge system.
SwD6 O CaD5LC This is a part of the Discharge system.
SwD6 C CaD6LC This was added to the Divider for proper function.
SwD7 O CaD7LC Not used for that level of voltage.
Voltage of the storage capacitors falls to the lowest level still possible to deliver the electricity to the user.

Step 7

SwD1 O CaDHC Voltage level again adequate for the user's needs.
CaD1LC This is a part of the Discharge system.
SwD2 O CaD2LC This is a part of the Discharge system.
SwD3 O CaD3LC This is a part of the Discharge system.
SwD4 O CaD4LC This is a part of the Discharge system.
SwD6 O CaD5LC This is a part of the Discharge system.
SwD6 O CaD6LC This is a part of the Discharge system.
SwD7 C CaD7LC This is final add on to the Divider for proper function before the Divider stops functioning.
All low capacitance capacitors are now engaged. When the voltage drops to a critical level again, the system will stop providing any more power to the user.

What is claimed is:

1. An electrical charging and discharging system comprising:
    an electrical energy source,
    an array of capacitors, said capacitors being conductively connected together, said array of capacitors being conductively connected to said energy source,
    a plurality of electrical sensors,
    a plurality of electrical switching means,
    a computer, said computer being conductively connected to said electrical sensors, said computer being conductively connected to said switching means,
    software means, and
    at least one electrical outlet connector, said capacitors being connected together in series, said capacitors being connected in parallel, said capacitors having high capacity, said capacitors having low capacity, said capacitors being capable of holding charges at high voltages.

2. The electrical charging and discharging system of claim 1 wherein said electrical source is Direct Current, said capacitor array forming an initial charging system, said capacitor array forming one or more optional intermediate charging systems, said capacitor array forming one or more discharge systems, said initial array being energized by said electrical source, said sensors generating a signal, said computer activating said switching means, said switching means regulating said intermediate arrays, said switching means regulating said discharging system and
    a distribution means, said distribution means having at least one electrical outlet, a rectifying means, and said means modifying said electricity thereby producing Alternating Current.

3. The capacitor of claim 1, said capacitor comprising:
    at least one pair of conductive plates that function as capacitor electrodes, a dielectric interface layer positioned between said conductive electrodes and being in contact with said electrodes, a plurality of insulating materials interspersed with a plurality of conductive materials not mutually connected to each other.

4. The capacitor of claim 3, wherein said conductive plates are made of pure metals/metal alloys possessing high conductivity, said electrodes being made of non-metallic conductive materials, and said electrodes being made of superconductive materials.

5. The capacitor of claim 4 wherein conductive electrodes made of metallic materials comprise pure metals/alloys of copper, gold, silver, tin, indium, zinc metals, and
    said conductive plates being made of nonmetallic conductive materials comprising amorphous carbon, graphite, conductive organic polymers from the group including doped poly anilines, poly thiophens, poly pyrroles,
    said electrodes being made of superconducting materials from the group of pure metals/metal alloys, including lead, mercury, niobium and alloys thereof at the liquid helium temperatures, said capacitor electrodes being made of high temperature superconducting copper oxide-based perovskite type ceramic materials at the liquid nitrogen temperatures,
    said superconductive ceramic materials and their respective Critical Temperatures being—Y $Ba_2Cu_3O_7$ (92K); $Bi_2Sr_2Ca_2Cu_3O_{10}$ (110K); $Tl_2Ba_2Ca_2Cu_3O_{10}$ (125K), Hg $Ba_2Ca_2Cu_3O_8$ (133K), $Hg_{0.8}Tl_{0.2}Ba_2Ca_2Cu_3O_{8.33}$ (138K).

6. The capacitor of claim 3 wherein a dielectric interface layer comprises inorganic materials having very high dielectric permitivities, said dielectric layer comprising organic polarizable materials possessing high dielectric permitivities.

7. The inorganic dielectric materials of claim 6 incorporating into said perovskite structure an oxide of titanium, at least one oxide taken from the group of alkaline earth metals including magnesium, calcium, strontium and barium, and incorporating at least one oxide of metals from the group of lead, copper, and rare earth metals.

8. The inorganic dielectric material of claim 7, consisting of calcium, copper, titanium and oxygen having a formula Ca $Cu_3Ti_4O_{12}$, manufactured by a method resulting in a structure comprising two discrete regions, a first being made of a semi conductive material, and a second region being made of an insulating ceramic material, each of which is dispersed into an extremely low particle size, down into a single digit nanometer dimensions, wherein semi conducting particles are surrounded and separated by regions of insulating, non conducting ceramic particles, that after calcining thereby result in a calcining the material having very high dielectric permittivity.

9. The organic dielectric materials of claim 6, comprising highly polarizable molecules from the group including cross-linked polyporphyrins and polyphthalocyanines and their metal (Zn, Cu) complexes, and comprising organic polymeric materials used for non-linear optics applications, possessing high polarizabilities.

10. A dielectric material of claim 9, said dielectric material having a high dielectric permittivity comprising exclusively organic compounds, consisting of a polymeric material possessing a high polarizability, polymeric materials possessing high insulating, and high dielectric strength incorporated into a percolative composite material having a high dielectric permittivity and a high dielectric strength.

11. An insulating polymer with good dielectric strength of claim 10 selected from the families of aliphatic and aromatic hydrocarbon polymers, as well as fluoro polymers, homo polymers/co-polymers, having linear/branched structures, one of the polymers being poly (vinylidene flouride trifluoroethylenechlorotrifluoroethylene) terpolymer.

12. The dielectric material of claim 6 comprising highly conductive nanoparticles such as either metal nanoclusters in low nano/sub-nano sizes or highly conductive organic polymer nanoparticles, percolatively dispersed in an insulating inorganic/organic material, resulting in high dielectric permittivity values.

13. The dielectric material of claim 6 consisting of a composite material comprising nanoclusters of a high temperature superconducting copper oxide-based perovskite material, with a chemical composition identical to compositions of high temperature superconducting materials claimed in claim 5, dispersed at/below percolation threshold concentration, within a matrix of a manganese oxide-based ceramic material displaying a property of Colossal Magneto-Resistance (CMR), where a strong magnetic field induces an extremely large electrical resistance in such a material, whereby at temperatures below 100 K the copper-based superconductive material would display superconducting properties, including the expulsion of the magnetic field from the interior of superconductive nanoparticles and manganesebased CMR nanoparticles gain an extremely high electrical resistance as a result of extremely high magnetic fields surrounding superconducting nanoparticles, thereby resulting in extremely high relative permitivities and dielectric strength.

14. A colossal magnetoresistive material of claim 13 wherein the making of a composite dielectric materials for high energy capacitors comprises a perovskite manganite of a general formula from the group including $R_{1-x}A_xMnO_3$ (R=La, Pr, or Nd and A=Ca, Sr, Ba, or Pb).

15. The capacitor of claim 6 wherein high dielectric permittivity materials are deposited layer-by-layer and interspersed with a multilayer, tile-like, flat material barriers that possess a high dielectric strength, said materials being strong insulators, said materials being good conductors comprising metals highly conductive organic polymers not mutually and conductively connected.

* * * * *